US008917201B2

(12) United States Patent
Malaga

(10) Patent No.: US 8,917,201 B2
(45) Date of Patent: Dec. 23, 2014

(54) ADS-B RECEIVER SYSTEM WITH MULTIPATH MITIGATION

(75) Inventor: Alfonso Malaga, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 642 days.

(21) Appl. No.: 13/250,003

(22) Filed: Sep. 30, 2011

(65) Prior Publication Data

US 2013/0082867 A1 Apr. 4, 2013

(51) Int. Cl.
*G01S 13/00* (2006.01)
*H04B 7/185* (2006.01)
*H04B 1/10* (2006.01)
*H04B 7/08* (2006.01)
*G08G 5/00* (2006.01)

(52) U.S. Cl.
CPC .......... *H04B 7/18506* (2013.01); *G08G 5/0008* (2013.01); *H04B 1/1081* (2013.01); *H04B 7/086* (2013.01)
USPC ................. 342/40; 342/36; 342/37; 342/159; 342/175

(58) Field of Classification Search
CPC ..................... G01S 7/023; G01S 7/40–7/4056; G01S 13/5244–13/528; G01S 13/93; G01S 13/9303
USPC .............................. 342/29–51, 159–164, 175
See application file for complete search history.

(56) References Cited

U.S. PATENT DOCUMENTS

| | | | | |
|---|---|---|---|---|
| 5,107,268 A * | 4/1992 | Sturm et al. | ..................... | 342/36 |
| 5,144,315 A * | 9/1992 | Schwab et al. | ................... | 342/49 |
| 5,317,323 A * | 5/1994 | Kennedy et al. | ............... | 342/457 |
| 5,448,243 A * | 9/1995 | Bethke et al. | .................... | 342/59 |
| 5,528,244 A * | 6/1996 | Schwab | .......................... | 342/37 |
| 6,469,654 B1 * | 10/2002 | Winner et al. | .................. | 342/33 |
| 6,567,043 B2 * | 5/2003 | Smith et al. | .................... | 342/450 |
| 6,633,259 B1 * | 10/2003 | Smith et al. | .................... | 342/456 |

(Continued)

FOREIGN PATENT DOCUMENTS

WO 0205454 A2 1/2002
WO 2010060651 A1 6/2010

OTHER PUBLICATIONS

"Techniques for Improved Reception of 1090 MHZ ADS-B Signals", W. Harman, J. Gertz, A. Kaminsky. Digital Avionics Systems Conference, 1998. Proceedings., 17th DASC. The AIAA/IEEE/SAE, Date Oct. 31, 1998-Nov. 7, 1998, pp. G25-1-G25-9.*

(Continued)

*Primary Examiner* — Peter Bythrow
(74) *Attorney, Agent, or Firm* — Shumaker & Sieffert, P.A.

(57) ABSTRACT

Systems and methods for receiving ADS-B messages in environments where multipath propagation corrupts the messages or blocks the reception of the messages. An exemplary system combines RF signal processing and digital signal processing techniques to make it possible to receive ADS-B messages in the presence of multipath reflections from nearby structures and/or farther out structures. The system uses an array of horizontally spaced antennas. The RF signals from the antennas are combined by the receiver so as to form a set of beams with different azimuth antenna patterns to increase the probability that the multipath does not combine destructively with the line-of-sight path in at least one of the beams. This effectively removes multipath reflections where the delay of the multipath relative to the line-of-sight path is less than 100-200 nanoseconds. The system is also configured to remove multipath reflections with greater delays relative to the line-of-sight path.

19 Claims, 13 Drawing Sheets

(56) References Cited

U.S. PATENT DOCUMENTS

| | | | |
|---|---|---|---|
| 6,657,043 | B1 | 12/2003 | Guerret et al. |
| 6,806,829 | B2 * | 10/2004 | Smith et al. .................. 342/456 |
| 7,495,614 | B2 * | 2/2009 | Small .......................... 342/458 |
| 7,688,250 | B2 * | 3/2010 | Billaud et al. ................. 342/40 |
| 7,936,300 | B2 * | 5/2011 | Billaud .......................... 342/37 |
| 2002/0021247 | A1 | 2/2002 | Smith et al. |
| 2002/0130809 | A1 * | 9/2002 | Kim .............................. 342/125 |
| 2006/0148429 | A1 * | 7/2006 | Inogai et al. ............... 455/115.1 |
| 2006/0232467 | A1 * | 10/2006 | Small ....................... 342/357.09 |
| 2010/0085243 | A1 * | 4/2010 | De Gramont et al. ........ 342/175 |
| 2012/0092211 | A1 | 4/2012 | Hampel et al. |

OTHER PUBLICATIONS

Mr. Leon Purton, et al.; Identification of ADS-B System Vulnerabilities and Threats, Australasian Transport Research Forum 2010 Proceedings, Sep. 29-Oct. 1, 2010, Canberra, Australia; Defence and Security Applications Research Centre, University of New South Wales, Australian Defence Force Campus, ACT 2600.

Reck et al., "Detection of SSR Signals in Multipath Airport Environments by a Multichannel Receiver," Proceedings of Asia-Pacific Microwave Conference, Dec. 2010, 4 pp.

Reck et al., "Spatial Filtering and Equalization for Ssr Signal Detection in a Multipath Environment," Proceedings of the 6th German Microwave Conference, Mar. 14-16, 2011, 4 pp.

Search Report from counterpart European Application No. 12186196.7, dated Sep. 2, 2014, 3 pp.

Examination Report from counterpart European Patent Application No. 12186196.7, dated Sep. 25, 2014, 5 pp.

* cited by examiner

ADS-B RECEIVER SYSTEM WITH MULTIPATH MITIGATION

BACKGROUND OF THE INVENTION

When aircraft are operating on the airport surface, it has been observed that reception of automatic dependent surveillance-broadcast (ADS-B) squitters from aircraft that are within line-of-sight of the ADS-B receiver is often not reliable. A closer examination of structures in the vicinity of the airport has revealed that multipath reflections from these structures are the likely explanation for the missed reception of the ADS-B squitters. When the aircraft is in the air or moving at take-off or landing speeds, the effect of the multipath reflection is inconsequential and may result in the loss of a single squitter. However, when the aircraft is stationary or moving slowly, the multipath reflections may hide the true ADS-B squitters.

The most common source of multipath in flat open areas such as airport runways is a ground reflection. However, the distances between aircraft operating on the airport surface are too short for the ground reflections to cause deep fades. Instead, reflections from buildings, other aircraft, etc are more likely to be the root cause of deep fades.

In order to understand the conditions under which multipath produces deep fading on the airport surface, we need to make use of the following physical relationships between the direct path and the reflected multipath.

The total received signal power, $P_r$, due to the direct and reflected signals is given by $$P_R = P_T [\lambda/4\pi d]^2 |1 + R(\theta_r) e^{j\Delta}|^2$$

where $R(\theta_r)$ is the reflection coefficient of the reflecting structure. The reflection coefficient has magnitude between 0 and 1 and phase between 0 and 180 degrees. Perfect cancellation between the direct path and the reflection occurs when the reflection coefficient $R(\theta_r)$ has magnitude unity and the phase of the reflection coefficient plus the relative phase shift $\Delta$ due to the difference in the distances traveled by the direct and reflected path add up to an odd multiple of 180 degrees.

The phase difference $\Delta$ and the difference in time of arrival (delay) $\tau$ between the direct and the reflected signals depends on the difference in the distances traveled, i.e.

$$\Delta = 2\pi(s_1 + s_2 - d)/\lambda = 2\pi f \tau$$

where d, $s_1$ and $s_2$ are distances, $\lambda = c/f$ is the wavelength, c is the speed of light and f=1090 MHz is the ADS-B carrier frequency.

In general, the amplitude and phase of the reflection coefficient depend on the angle of reflection, $\theta_r$, the polarization of the signal, the dielectric and conducting properties of the ground, and the frequency, i.e.

$$R(\theta_r) = [\sin \theta_r - \chi(\theta_r)]/[\sin \theta_r + \chi(\theta_r)]$$

where $\chi(\theta_r) = [(\epsilon_r - \cos^2 \theta_r) - j60\sigma\lambda]^{1/2}/[\epsilon_r - j60\sigma\lambda]$, polarization perpendicular to reflecting surface $\chi(\theta_r) = [(\epsilon_r - \cos^2 \theta_r) - j60\sigma\lambda]^{1/2}$, polarization parallel to reflecting surface where $\epsilon_r$ is the dielectric constant of the reflecting surface relative to unity in free space, $\sigma$ is the conductivity of the reflecting surface in mhos/m and $\theta_r$ is the reflection angle.

An illustration of multipath propagation due to reflections from structures on the airport surface when one aircraft at location A1 on the airport surface is broadcasting ADS-B messages and another aircraft on location A2 is attempting to receive the messages is shown in FIG. 1.

The separation distance between the aircraft is d. Multipath interference occurs when a reflecting structure at location R is oriented relative to the two aircraft so that a signal transmitted by the aircraft in location A1 is reflected in the direction of the aircraft in location A2. The reflecting surface may be another aircraft or vehicle on the airport surface, or a building or any other fixed structure. The distance traveled by the reflected signal, $s_1 + s_2$, is greater that the distance, d, traveled by the direct line-of-sight path between the two aircraft.

The time delay or difference in arrival time, $\tau$, between the direct and reflected paths is given by $$\tau = (s_1 + s_2 - d)/c \quad (1)$$

where $c = 3 \times 10^8$ m/s is the speed of light.

An ellipse with major axis (−a, a) and minor axis (−b, b) and focus points at A1 and A2 plots the locus of all possible locations where a reflecting surface R can produce a multipath reflection with time delay $\tau$ relative to the direct path along the major axis of the ellipse. The angle of arrival $\phi_1$ or $\phi_2$ of the multipath relative to the angle of arrival of the direct path can be anywhere between 0 degrees when the reflecting point is in front of the receiving antenna along the major axis of the ellipse to 90 degrees when it is off to the side and up to 180 degrees when it is behind the receiving system along the major axis of the ellipse.

The ADS-B squitter messages broadcast by each aircraft consist of sequences of 112 pulses of 500 nanoseconds' duration. Each pulse is broadcast within a 1 microsecond interval either in the first 500 nanoseconds or the second 500 nanoseconds slot. The slot occupied by each pulse indicates whether the information bit represented by the pulse is a "0" or a "1". This is known as pulse position modulation.

The effect of multipath reflection on the reception of the sequence of pulses in an ADS-B message and the appropriate mitigation depend on the delay between the multipath reflection and the direct path as discussed in the paragraphs below.

When the difference in travel time, i.e., time delay, between the direct and reflected paths is small compared to the 500 nanosecond pulse duration, i.e., when $\tau < 50$ ns, the pulse that is received via the reflected path arrives practically within the same slot interval as the direct path pulse. In this case the two overlapping pulses may add up if the phase of the reflected pulse is the same as the phase of the direct path pulse in which case no harm is done. Or the two overlapping pulses may cancel if they have nearly equal amplitudes and they are 180 degrees out-of-phase. If the transmitting and receiving aircraft are stationary or moving slowly the entire sequence of pulses in an ADS-B message will suffer from destructive multipath cancellation resulting in a failure to receive the transmitted pulse, as illustrated in FIG. 2.

An idea of the extent of airport surface area over which ADS-B squitter message reception is vulnerable to missed squitter reception due to multipath with short delay offset may be obtained from the dimensions of the major axis and the minor axis of an ellipse corresponding to multipath reflections with 50 ns time delay. Table 1 below shows the dimensions of the 50 ns time delay ellipse as a function of the separation distance d between the transmitting aircraft and the receiving aircraft. Reflecting structures that are within an elliptical boundary with these dimensions will produce multipath reflections with short delays.

TABLE 1

50 ns Time Delay Ellipse Dimensions

| Separation Distance d (m) | Major Axis Dimension 2a (m) | Minor Axis Dimension 2b (m) |
|---|---|---|
| 100 | 115 | 56.8 |
| 200 | 215 | 78.9 |
| 300 | 315 | 96.0 |
| 400 | 415 | 110.6 |
| 500 | 515 | 123.4 |
| 600 | 615 | 135.0 |
| 700 | 715 | 145.7 |
| 800 | 815 | 155.6 |
| 900 | 915 | 165.0 |
| 1000 | 1015 | 173.8 |

Like ground reflection multipath, short delay multipath can be mitigated by using more than one antenna and receiver (diversity) to receive the ADS-B messages. However, unlike ground multipath, the use of top mounted and bottom mounted antennas do not necessarily provide mitigation against short delay multipath due to reflections from structures to the side of the LOS path if the top and bottom mounted antennas have omni-directional patterns.

To understand how pulse cancellation due to short delay multipath reflections from side structures can be mitigated $P_R = P_T[\lambda/4\pi d]^2 |1+R(\theta_r)e^{j\Delta}|^2$ is re-written as $$P_R = P_T[\lambda/4\pi d]^2 G_1(0) G_2(0) |1 + A(\phi_1,\phi_2,G_1,G_2) R(\theta_r)e^{j\Delta}|^2$$

where $A(\phi_1,\phi_2,G_1,G_2)$ is an amplitude factor which is proportional to the ratio of the transmitting and receiving antenna gains $G_1(\phi_1)$ and $G_2(\phi_2)$ in the direction of the reflected path to the antenna gains $G_1(0)$ and $G_2(0)$ in the direction of the direct path, i.e.

When the difference in travel time between the direct and reflected paths is in the order of or greater than the 500 nanosecond pulse duration, i.e., when τ>450 ns, the pulse that is received via the reflected path arrives in the next or later slot interval, thereby interfering with the correct decoding of the pulse position in subsequent pulse intervals as illustrated in FIG. 3. The delayed pulse may arrive in the unoccupied slot during the current or next pulse interval so that a pulse is received in both slot positions making it difficult to determine which slot position is the correct one. Or the delayed pulse may arrive in the same slot as the pulse transmitted in the next interval in which case cancellation may occur if the two pulses are 180 degrees out of phase or they may add up if they are in phase.

In any case, long delay multipath produces "intersymbol interference" that makes correct decoding of the sequence of ADS-B squitter message not possible.

Table 2 below shows the dimensions of the 450 ns time delay ellipse as a function of the separation distance d between the transmitting aircraft and the receiving aircraft. Reflecting structure outside an ellipse with these dimensions will produce multipath reflections with long delays.

TABLE 2

450 ns Time Delay Ellipse Dimensions

| Separation Distance d (m) | Major Axis Dimension 2a (m) | Minor Axis Dimension 2b (m) |
|---|---|---|
| 100 | 235 | 212.6 |
| 200 | 335 | 268.8 |
| 300 | 435 | 315.0 |
| 400 | 535 | 345.2 |
| 500 | 635 | 391.4 |
| 600 | 735 | 424.6 |
| 700 | 835 | 455.2 |
| 800 | 935 | 484.0 |
| 900 | 1035 | 511.2 |
| 1000 | 1135 | 536.8 |

Table 2 shows that multipath reflections with delays longer than 450 ns can be produced within an airport surface of not too big an extension. To get an idea of what the maximum delay of multipath reflections might be, Table 3 below shows the dimensions of a 2000 ns time delay ellipse (i.e., multipath reflections with delays up to 2000 ns possible at large airports).

TABLE 3

2000 ns Time Delay Ellipse Dimensions

| Separation Distance d (m) | Major Axis Dimension 2a (m) | Minor Axis Dimension 2b (m) |
|---|---|---|
| 100 | 700 | 692.8 |
| 200 | 800 | 774.6 |
| 300 | 900 | 848.6 |
| 400 | 1000 | 916.6 |
| 500 | 1100 | 979.8 |
| 600 | 1200 | 1039.2 |
| 700 | 1300 | 1095.4 |
| 800 | 1400 | 1149.0 |
| 900 | 1500 | 1200.0 |
| 1000 | 1600 | 1249.0 |

Diversity reception with multiple antennas with different azimuth antenna patterns does not prevent incorrect decoding of ADS-B message bits when the delayed pulse arrives in a later unoccupied pulse position. In this case, a pulse is received in both possible pulse position slots making it impossible for the receiver to differentiate between the direct path pulse and the reflected path pulse, especially when the reflecting structure is a highly conducting metallic object so that both pulses have equal or nearly equal amplitudes. Traditionally, digital communications systems that suffer from destructive interference from multipath with delay that is longer than the duration of transmitted modulation symbols use adaptive equalization to continuously estimate and cancel the interference that one symbol inflicts on subsequent symbols (inter-symbol interference). The adaptive equalizers may be classified as linear equalizers if they employ a linear Finite Impulse Response (FIR) filter with adaptive "tap weights" or as nonlinear decision feedback equalizers if they employ a linear FIR as well as a feedback FIR filter to cancel the inter-symbol interference. The adaptation of the linear or nonlinear FIR filter tap weights may be classified as pilot or training data-assisted equalization if known data is interleaved with information bearing symbols or as blind equalization if no known data is interleaved. In order for the tap weights of the adaptive filters to converge to the optimum values that result in the cancellation of the inter-symbol interference, the equalizer must be trained for a sufficiently long period of time at the beginning of a transmission and then they must continue adapting to maintain the tap-weight settings at their optimum value if the channel multipath is slowly changing. Therefore adaptive equalizers are most effective when used in systems that transmit data continuously over a channel with multipath that changes in time or which transmit long bursts of data preceded by a sufficiently long training preamble.

In the case of ADS-B messages, the waveform has already been defined and cannot be modified to make it more suitable for use with the above mentioned adaptive equalization techniques. The ADS-B message is very short (112 bits long) and the preamble consists of only four pulses of known position (too short to train an equalizer). The entire ADS-B message duration including the preamble and extended squitter message is less than 128 microseconds. The short preamble makes the use of adaptive equalization techniques difficult at best.

Other types of receivers that are commonly used in multipath channels are RAKE receivers. A RAKE receiver combines ("rakes") the multipath coherently to improve the signal-to-noise ratio. RAKE receivers are employed when the multipath does not cause inter-symbol interference. They are used in systems where gaps between symbols are interleaved to allow for the reception of the multipath.

In the case of the ADS-B message, the pulses in the message either have one pulse interval gap between them if they represent 00 or 11 bits, or the pulses are next to each other if they represent a 10-bit sequence or they have a two pulse gap if they represent a 01-bit sequence. When the transmitted pulses are adjacent each other, multipath that is 180 degrees out-of-phase with the direct path and which are delayed in the order of one pulse duration will cancel the next pulse. So a RAKE receiver will not be able to protect against this type of multipath interference and if there is no error correction, then this bit loss cannot be recovered.

SUMMARY OF THE INVENTION

The present invention provides systems and methods for improving or making it possible to receive ADS-B messages in environments where multipath propagation corrupts the messages or blocks the reception of the messages. An exemplary system combines RF signal processing and digital signal processing techniques to make it possible to receive ADS-B messages in the presence of multipath reflections from nearby structures and/or farther out structures.

The system uses an array of horizontally spaced antennas on the top or bottom of the fuselage or where some of the elements are on top and some in the bottom. The RF signals from these antennas are combined by the receiver so as to form a set of beams with different azimuth antenna patterns to increase the probability that the multipath does not combine destructively with the line-of-sight path in at least one of the beams. This effectively removes multipath reflections where the delay of the multipath relative to the line-of-sight path is less than 100-200 nanoseconds. And a digital signal processing algorithm is used to estimate the delays, amplitudes and phases of multipath components with delay greater than 200 ms from the received preamble in an ADS-B message and then these estimates are used to estimate and iteratively remove the multipath interference during the data portion of the message.

BRIEF DESCRIPTION OF THE DRAWINGS

Preferred and alternative embodiments of the present invention are described in detail below with reference to the following drawings:

FIGS. 6-1 through 6-4 show a flowchart of an exemplary process performed by the system shown in FIG. 4.

DETAILED DESCRIPTION OF THE INVENTION

Figure 4:
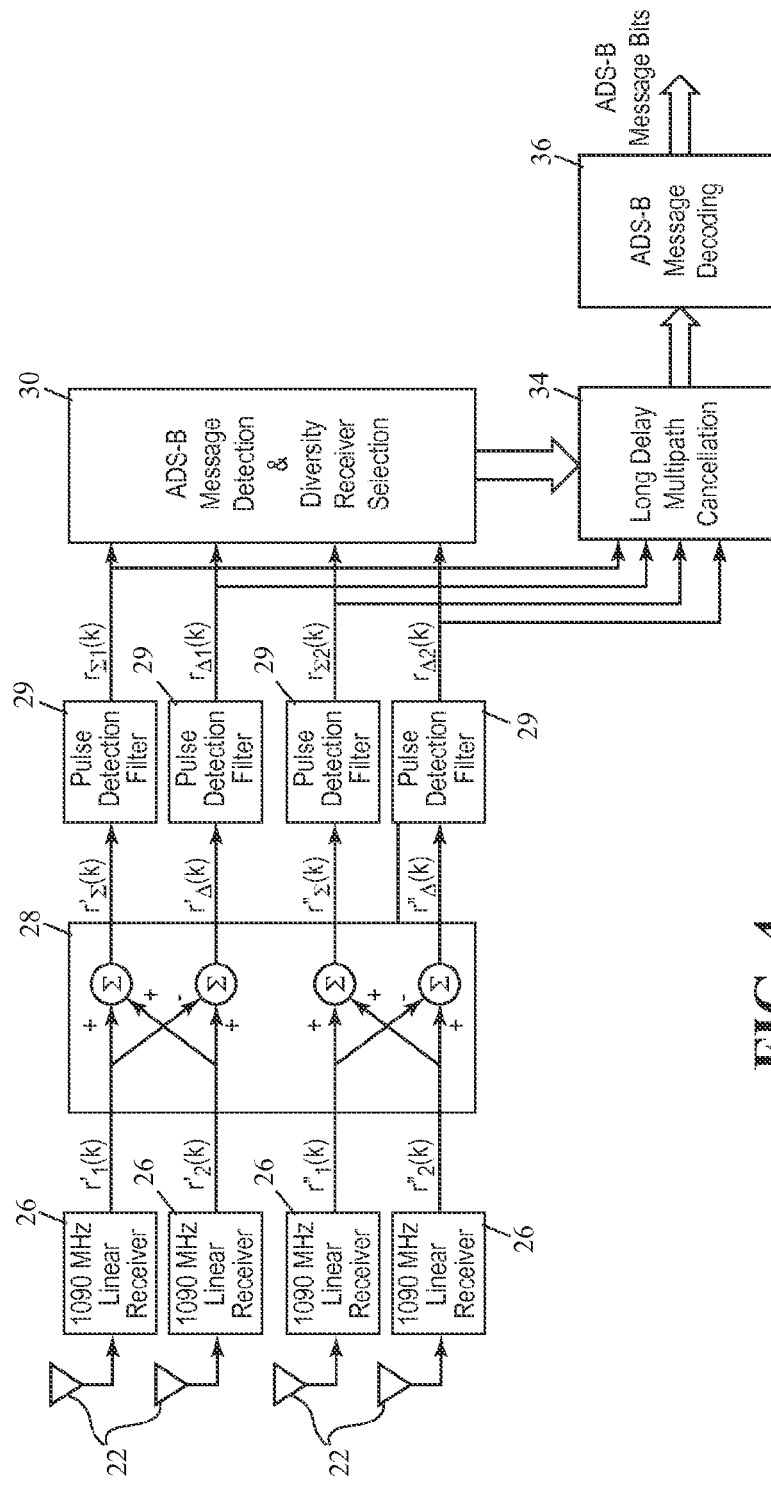
FIG. 4 illustrates an exemplary system formed in accordance with an embodiment of the present invention.

FIG. 4 is a block diagram of an automatic dependent surveillance-broadcast (ADS-B) receiver system 20, which uses message decoding algorithms with long delay multipath mitigation and multiple antenna diversity reception to provide mitigation against short delay multipath. The system 20 includes a plurality of antennas 22, with receivers 26, a beam forming device 28, a plurality of pulse detection filters 29, a device 30 that performs ADS-B burst detection on the plurality of diversity receivers, a device 34 that cancels the interference due to long delay multipath on a selected diversity receiver output, and a device 36 that performs message decoding.

Antenna space diversity is used to combat interference fading due to short delay multipath. Mode S transponder receivers that are also used to receive ADS-B messages employ top and bottom mounted omnidirectional antennas for diversity reception. Because these antennas are spaced in the vertical plane, they are most effective against multipath interference from ground reflections. However, multipath destructive interference (fading) due to reflections from other aircraft or structures on the airport surface is more severe than ground multipath fading. Multipath reflections from other aircraft and airport structures arrive from different azimuth directions. Thus, the system 20 includes antennas 22 that are spaced horizontally on an aircraft (not shown) to provide diversity protection against this type of multipath. Minimum spacing between the antennas 22 is half a wavelength but it can be more. With a wavelength of 1090 MHz then the spacing is approximately 30 cm or 1 foot.

In one embodiment, the ADS-B receiver system 20 shares the antennas 22 with a traffic collision avoidance system/airborne collision avoidance system (TCAS/ACAS). Diversity reception via the horizontally spaced antennas 22 protects against short-delay multipath destructive interference.

Consider the case of diversity reception using two antennas with omni-azimuth patterns. In this case the signals received by the two antennas, $r'_1(k)$ and $r'_2(k)$, are summed and subtracted to form two orthogonal sum and difference signals, $r'_\Sigma(k)$ and $r'_\Delta(k)$—see the beam forming block 28. The sum and difference signals can be thought of as corresponding to signals received by two antennas that have azimuth antenna patterns given by Sum Pattern: $\cos[(\pi s/\lambda)\cos(\phi-\phi_0)]$ (2)

Difference Pattern: $\sin[(\pi s/\lambda)\cos(\phi-\phi_0)]$ (3)

where s is the horizontal separation distance between the two antennas, $\phi$ is the azimuth angle of arrival of the signal and $\phi_0$ is the azimuth angle that the horizontal line through the two antennas makes with the direct line-of-sight path between the two aircraft.

From the two azimuth sum and difference gain factors, it can be seen that azimuth angles that result in peaks or nulls in one pattern will result in nulls or peaks in the other. Thus when the direct path and/or short delay multipath arrive from these directions, the signals combine differently and the probability that multipath and direct path cancel each other on both the sum and difference received signals is very small. However there are some azimuth angles for which both patterns have comparable gains. If both the direct path and the short delay multipath arrive at angles in which both patterns have comparable gains, then both sum and difference signals will be affected equally by the multipath and reception of an ADS-B message would be garbled regardless of whether the sum or difference signal is selected.

Figure 5:
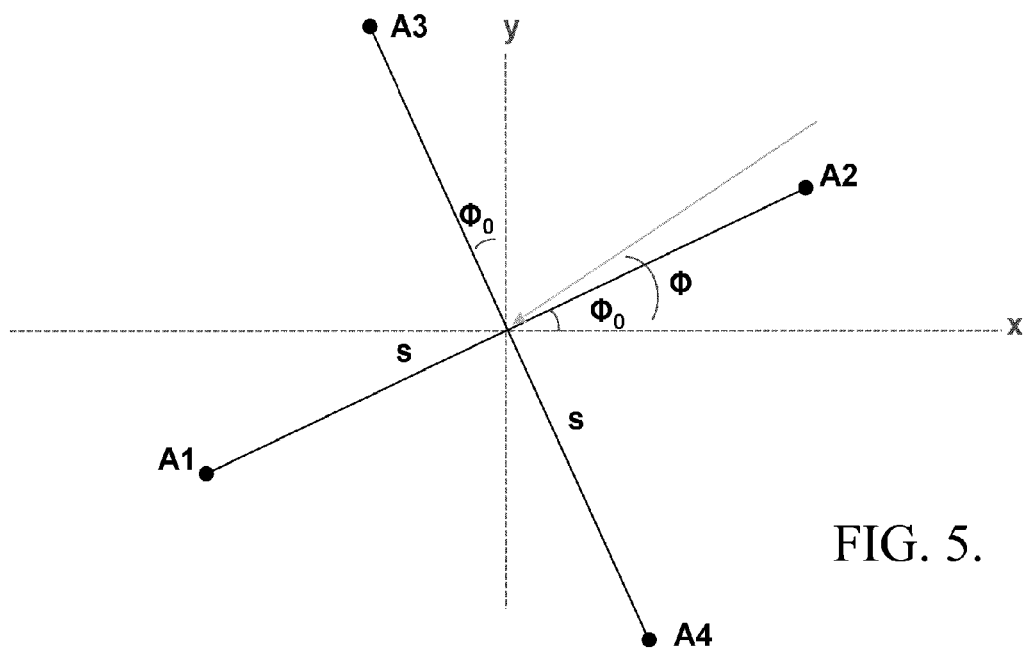
FIG. 5 illustrates a geometrical relationship of signals to antenna locations.

To reduce the vulnerability to short delay multipath that arrives from directions where the sum and difference antenna pattern directions do not provide protection, additional antennas and receivers are needed so that patterns with fewer azimuth angles with comparable gains in all signal streams can be formed. For example, see FIG. 5.

If such an antenna array of four elements were to be used to receive the ADS-B messages, the signals from the four antennas could be summed and subtracted to form two sets of sum and difference signals with azimuth antenna patterns given by $$\text{Sum}(A1, A2) \text{ Pattern: Cos } [(\pi s/\lambda)\cos(\phi-\phi_0)] \quad (4)$$

$$\text{Difference}(A1, A2) \text{ Pattern: Sin } [(\pi s/\lambda)\cos(\phi-\phi_0)] \quad (5)$$

$$\text{Sum}(A3, A4) \text{ Pattern: Cos } [(\pi s/\lambda)\sin(\phi-\phi_0)] \quad (6)$$

$$\text{Difference}(A3, A4) \text{ Pattern: Sin } [(\pi s/\lambda)\sin(\phi-\phi_0)] \quad (7)$$

In another embodiment, the four-element antenna array is split into two two-element arrays and one array is used as a top-mounted antenna and another as a bottom-mounted antenna. The signals from the top- and bottom-mounted antenna arrays are combined to form more complex antenna patterns with both azimuth and elevation antenna directivity that provide diversity protection against multipath from reflections from side structures as well as ground reflections. The device 30 processes each of the outputs of the beam forming device 28 to detect the reception of an ADS-B message and selects the output where the ADS-B message has been detected for long delay multipath cancellation and ADS-B message decoding.

The use of antenna pattern diversity does not provide protection against multipath with delay in the order of greater than the pulse duration. To protect against multipath with delays in the order of or longer than the pulse duration, the proposed ADS-B receiver employs the multipath mitigation techniques shown in the block diagram of FIG. 7.

The device 34 uses a data directed least-squares error multipath cancellation algorithm modified for use with the pulse position modulation employed for the transmission of ADS-B messages and a least-squares error algorithm to estimate the multipath channel gains from the known ADS-B message preamble data (pulses).

Figure 1:
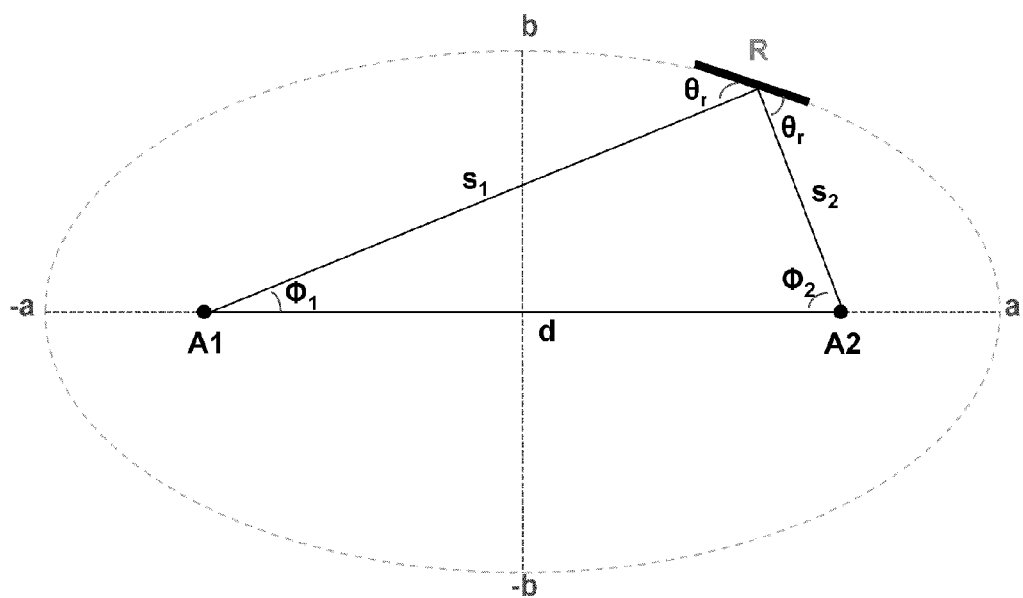
FIG. 1 shows the locus of possible reflection locations of a multipath signal with a given delay experienced between two radios.
Figures 1, 6:
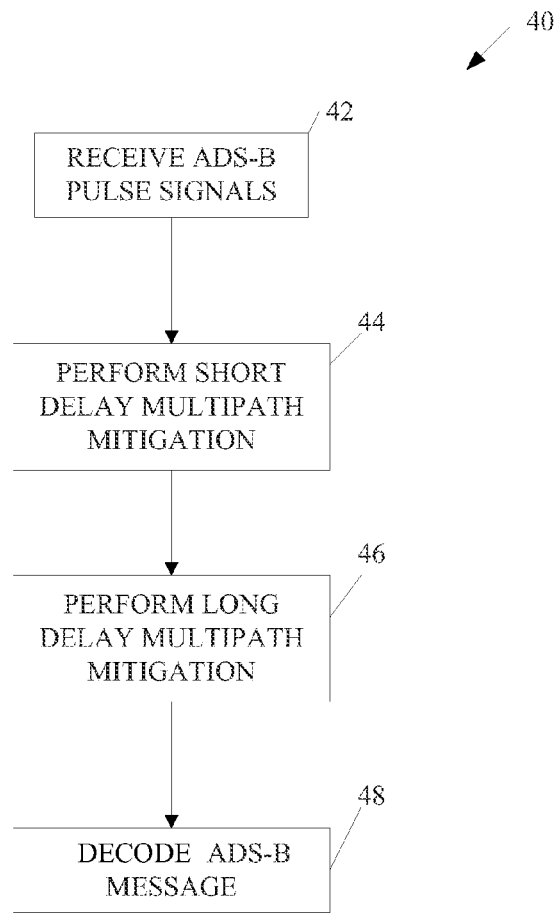
Figures 2, 6:
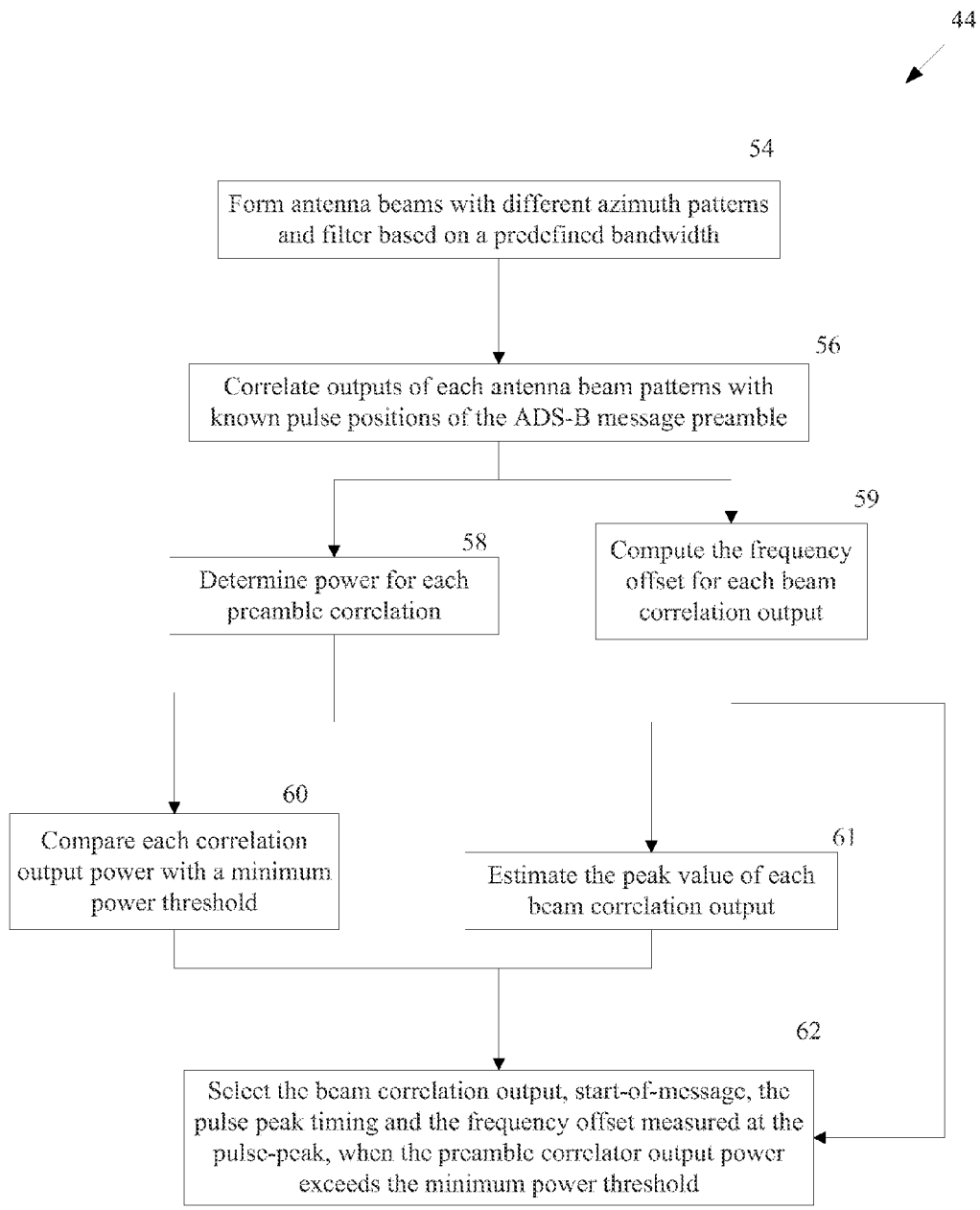
Figures 3, 6:
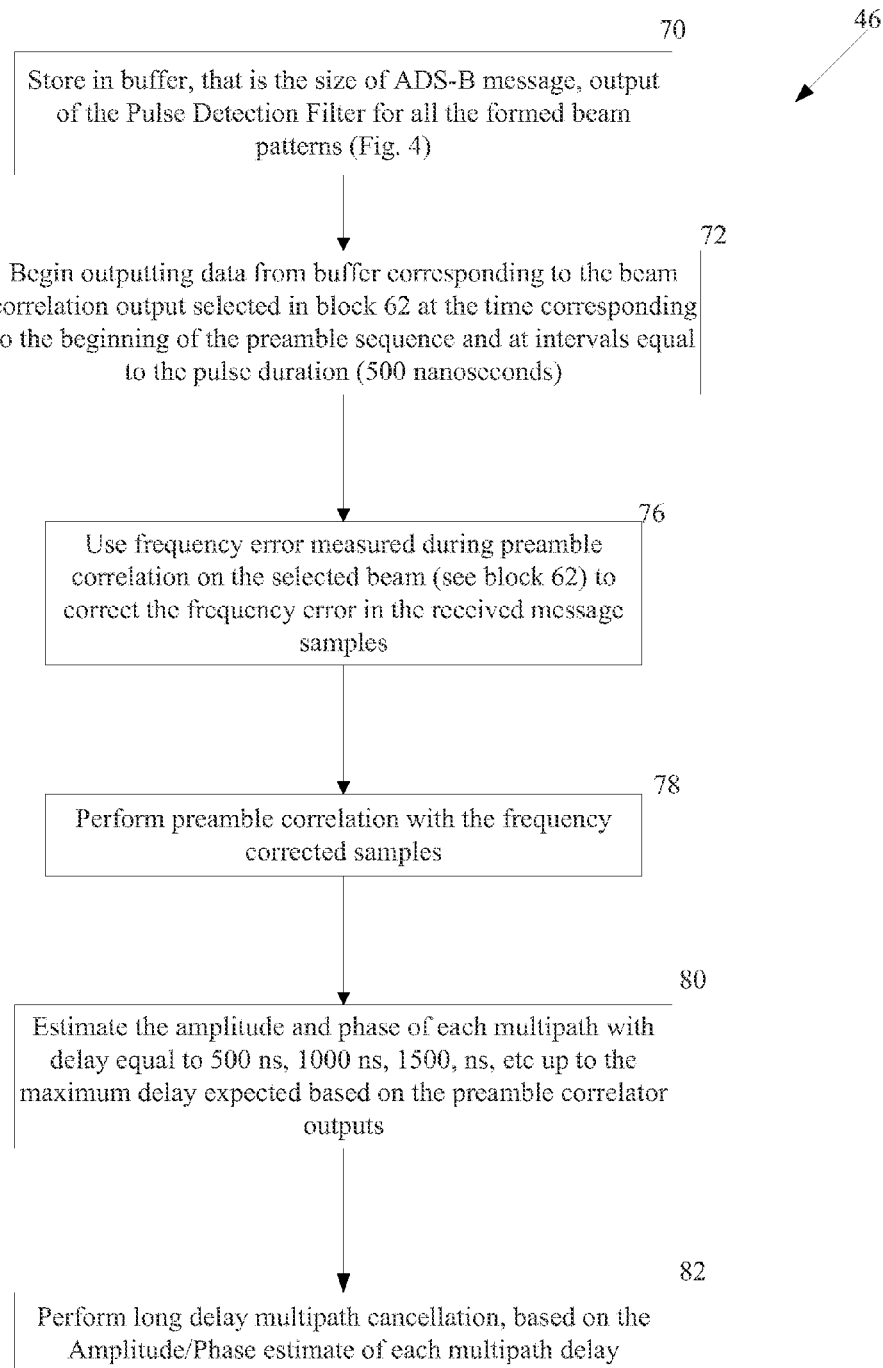
Figures 4, 6:
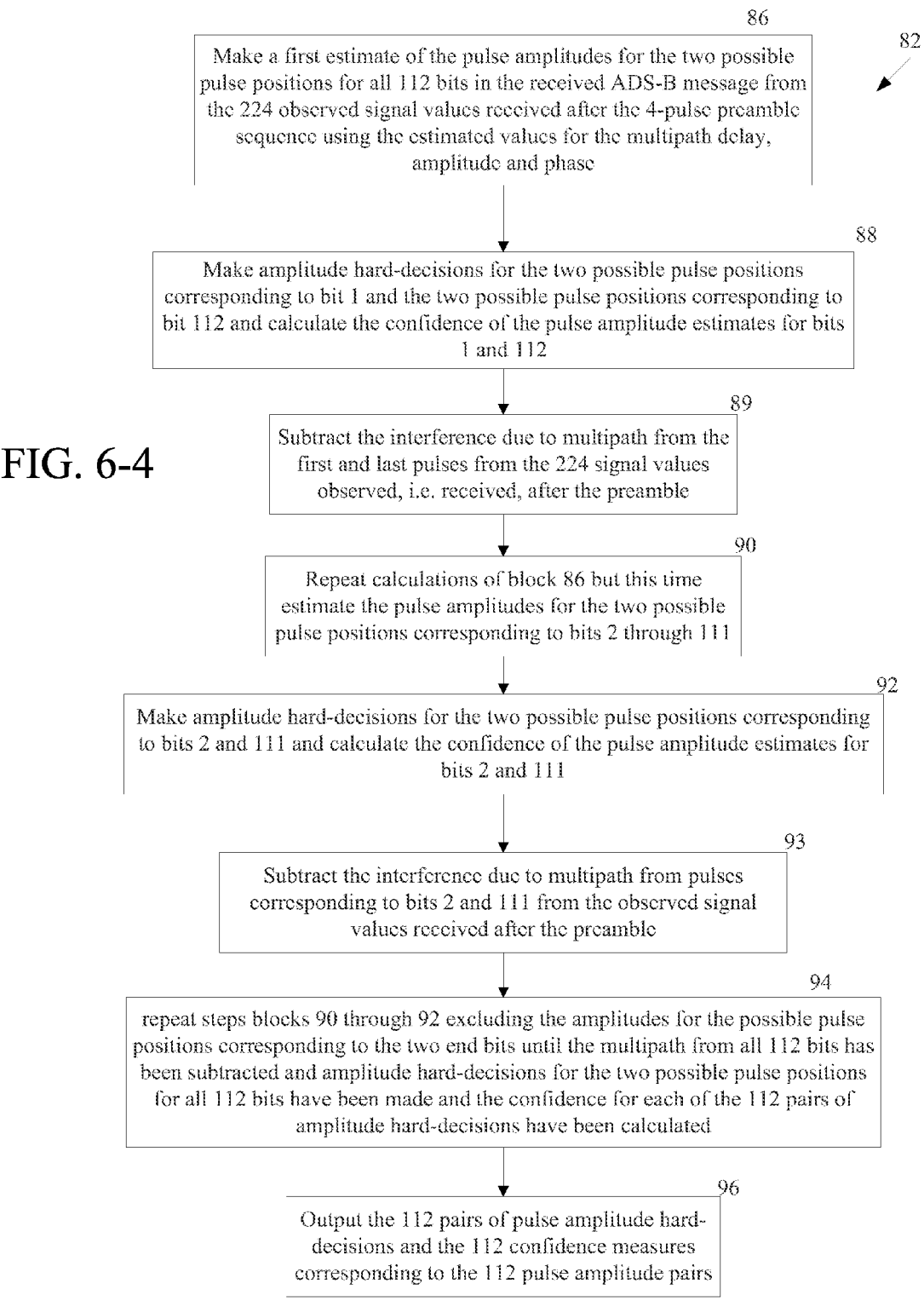

FIG. 6-1 illustrates a flowchart of an exemplary process 40 performed by the system 20. First at a block 42, ADS-B pulse signals are received at a plurality of antennas 22 and linear receivers 26. Next at a block 44, mitigation of short delay multipath pulse signals is performed. Then at a block 46, mitigation of long delay multipath pulse signals is performed. At a block 48, an ADS-B message is generated.

Figure 2:
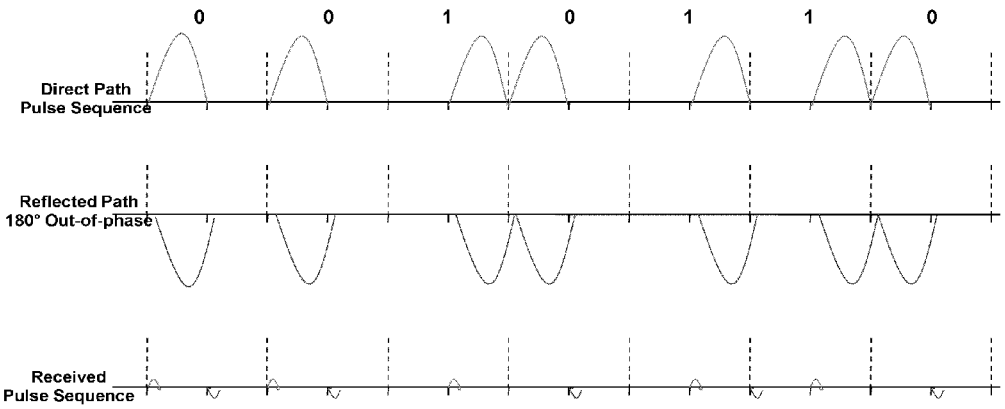
FIGS. 2 and 3 show two different interference conditions related to multipath interference where FIG. 2 applies when the delay of the multipath is short compared to the duration of the ADS-B pulses and FIG. 3 applies when the delay of the multipath is in the order of the duration of the ADS-B pulses.

FIG. 6-2 shows details of the step performed at block 44. At a block 54, antenna beams (i.e., antenna gain patterns) are formed with different azimuth patterns. Then at a block 56, an attempt is made to detect preamble on each of the outputs of each beam by correlating the outputs of each antenna beam with the known pulse positions of the ADS-B message preamble. At a block 58, the power at the output of each preamble correlator is calculated and simultaneously at block 59 the frequency offset is also measured continuously. At a block 60, each correlator output power is compared to a minimum power threshold and an indication is provided when the correlator output power exceeds the threshold. Simultaneously at a block 61, the timing at which the correlator output power (pulse peak) is greatest is estimated and an indication is provided. At a block 62, when a preamble is detected (preamble correlator output power exceeds minimum power threshold), the beam receiver output, the start-of-message, pulse-peak timing and the frequency offset measured at the pulse-peak are selected at a block 62 for further processing. If the preamble is detected on one or more of the beam outputs, the beam output with the highest detected signal level and the corresponding pulse-peak timing and frequency offset are selected.

Figure 3:
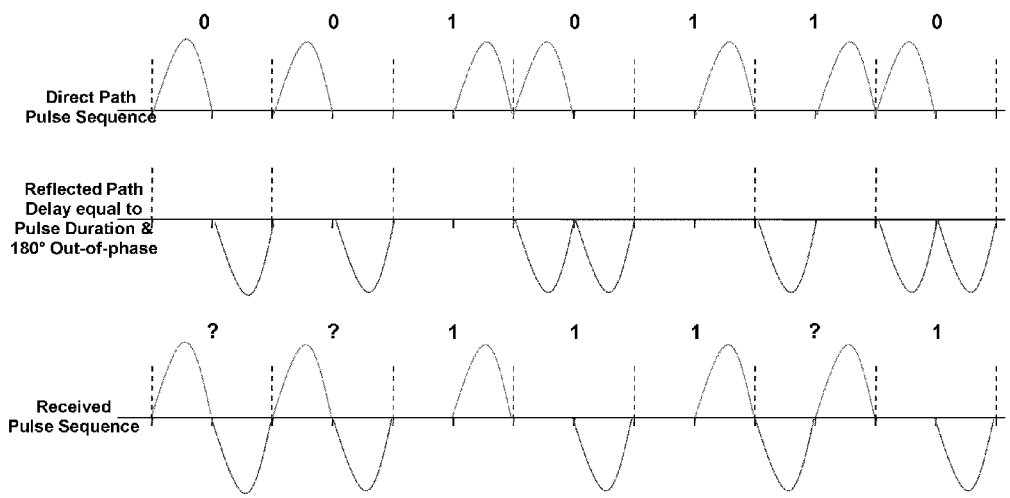

FIG. 6-3 shows details of the step performed at block 46. At a block 70, the sampled data outputs of each of the pulse detection filters for each of the antenna beams are stored in circular buffers large enough to hold an ADS-B message. When a preamble is detected, the data stored in the buffer corresponding to antenna beam selected in block 62 is output for further processing at intervals equal to the pulse duration (one complex sample per pulse) starting at a time corresponding to the start-of-message and pulse-peak timing. At a block 76, the frequency error/offset measured during preamble correlation on the selected beam is used to correct the frequency error in the received message samples. Next at a block 78, the frequency-error corrected received samples are correlated with the known ADS-B message 4-pulse preamble sequence. Then at a block 80, the preamble correlator outputs from block 78 are used to estimate the delay, amplitude and phase of each multipath component with delay equal to 500 ns, 1000 ns, 1500, ns, etc up to the maximum delay expected. And finally at a block 82, the estimates of the amplitude and phase of multipath with discrete values of delay equal to multiples of the ADS-B pulse duration, i.e. 500 ns, 1000 ns, 1500 ns, etc, are used to cancel the interference from long delay multipath and estimate the amplitudes of the two possible pulse positions for each of the bits in the ADS-B message.

FIG. 6-4 shows details of the step performed at block 82. At a block 86, the estimated values for the multipath amplitude and phase for each of the discrete multipath delay values are used to make a first estimate of the pulse amplitudes for the two possible pulse positions (1 or 2) for all 112 bits in the ADS-B message from the 224 observed signal values received after the 4-pulse preamble sequence. Next at a block 88, the estimated pulse amplitudes for the two possible pulse positions for the first bit (bit 1) and the two possible bit positions for last bit (bit 112) in the ADS-B message are compared to make pulse amplitude hard-decisions and calculate the confidence of the hard-decisions as follows. For bit 1 and bit 112, the pulse position with the larger estimated pulse amplitude is assigned an amplitude hard-decision value of 1 and the pulse position with the smaller estimated pulse amplitude is assigned an amplitude hard-decision value of 0. The ratio of the pulse position with larger estimated amplitude to the pulse position with the smaller estimated amplitude is the confidence for the pulse amplitude hard-decisions. Next at a block 89, the hard-decision pulse amplitudes for the two possible pulse positions for bits 1 and 112 are used to subtract the interference due to multipath from the first and last pulses from the 224 signal values observed, i.e. received, after the preamble. At a block 90, the step performed at block 86 is repeated but only for the pulse amplitudes for the two possible pulse positions for bits 2 through 111. At a block 92, pulse amplitude hard-decisions for the two possible pulse positions for bits 2 and 111 are made and the confidence for the pulse amplitude hard-decisions are calculated in similar fashion as described above for block 88. Next at a block 93, the pulse amplitude hard-decisions for the two possible pulse positions for bits 2 and 111 are used to subtract the interference due to multipath from pulses 2 and 111 from the observed signal values 3 through 222. Then at a block 94, the steps at blocks 90, 92 and 93 are repeated excluding the pulse positions corresponding to the two end bits until pulse amplitude hard-decisions for all possible pulse positions have been made, the multipath interference from all bits has been subtracted, i.e. cancelled, and confidence of the pulse amplitude hard-decisions have been estimated. Finally, at a block 96 the pulse amplitude hard-decisions for the two possible pulse positions for each of the 112 bits in the ADS-B message and the confidence of the hard-decisions are output to the ADS-B message decoding at a block 48.

Figure 7:
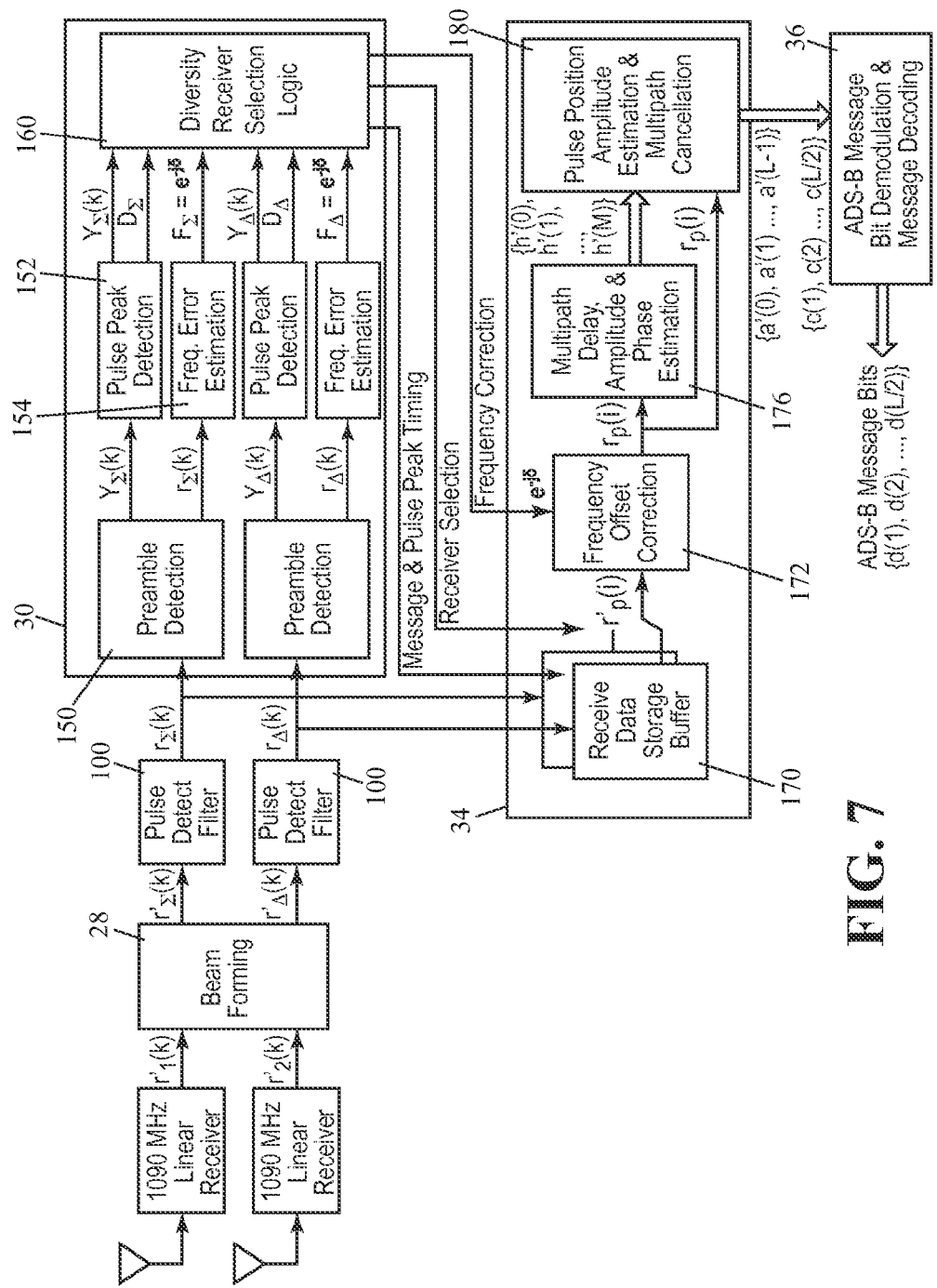
FIGS. 7-10 illustrate further details of the system shown in FIG. 4.
Figure 8:
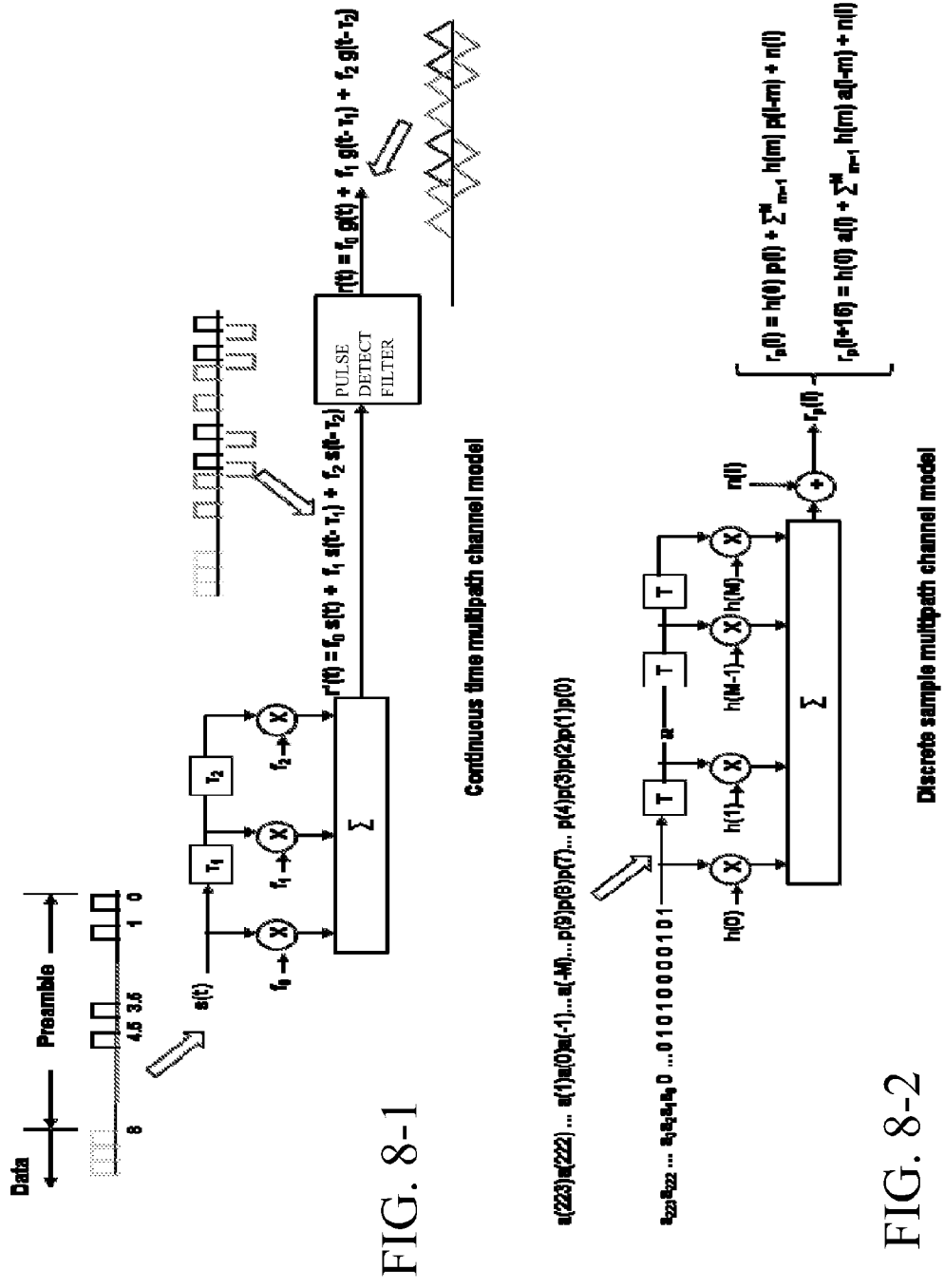

As illustrated in FIG. 8-1, when multipath with delays longer than an ADS-B pulse duration are present, the received signal r'(t) includes overlapped sequences of pulses (shown in different patterns), which make it difficult to detect the ADS-B message preamble 80. Therefore the present invention detects the message preamble 80 in the presence of long-delay multipath by using a preamble correlation filter that looks for the unique 4 pulse preamble transmitted at the beginning of each ADS-B message (performed at 150 in FIG. 7) and a pulse timing synchronization function that looks for the preamble pulse peaks (performed at 152 in FIG. 7) on each of the outputs of an antenna beam former (performed at 28 in FIG. 7) followed by a preamble detection and antenna beam selection function (performed at 160 in FIG. 7).

The ADS-B receiver system 20 shown in FIG. 7 includes pulse detection filters 100, preamble correlation/detection filters 150, pulse-peak detection processing 152 and frequency error estimation processing 154 to simultaneously detect the ADS-B message preamble, estimate the frequency error between the transmitter and receiver and find the pulse peaks. FIG. 7 also includes data storage buffers 170 to store received data while searching for a preamble detection, frequency correction processing 172, multipath delay, amplitude and phase estimation processing 176 and pulse position amplitude estimation and multipath cancellation processing 180 to be performed once a preamble has been detected. More detailed descriptions of the various processing blocks is provided in the following.

In one embodiment, the pulse detection filters are chosen to maximize the signal-to-noise ratio and reject interference from signals in adjacent channels. Because the center frequency of the ADS-B received signal is 1090 MHz±1 MHz, the pulse detection filters 100 have a bandwidth that is greater than the 2 MHz bandwidth of the ADS-B pulses. The pulse detection filters process the received data on both the sum and difference signal processing paths at a rate of N samples per pulse (2N samples per pulse period) where N≥2.

The pulse detection filters 100 are preceded by linear RF receiver front end components 26 in each signal processing path and by the sum and difference beam former 28. The sum and difference outputs of the beam former 28, r'$_\Sigma$(k) and r'$_\Delta$(k), include streams of samples received at a rate of at least N samples per pulse.

Figure 9:
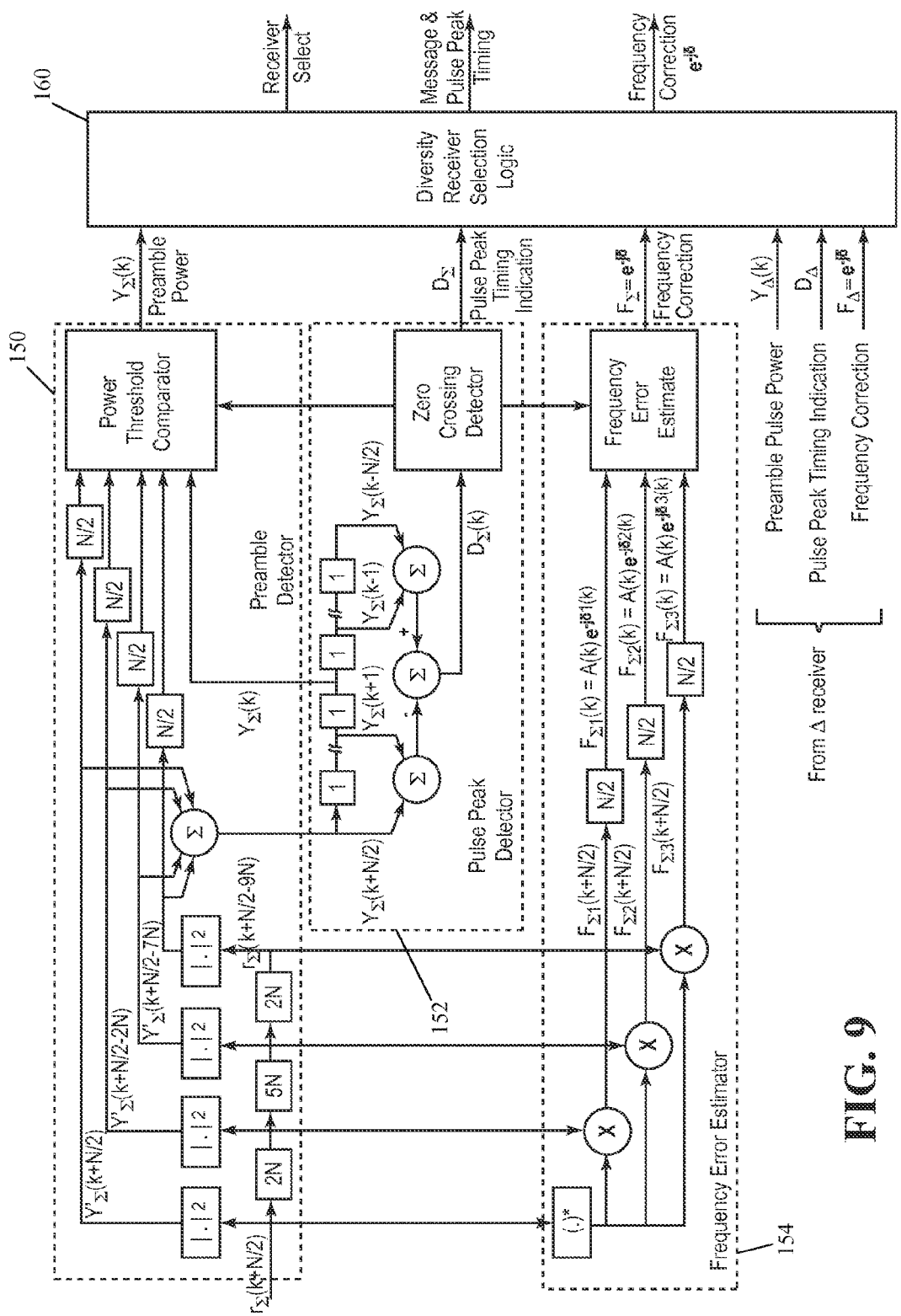

More detailed illustrations of one possible implementation of the preamble correlation/detection filters 150, the pulse-peak detection processing 152 and the frequency error estimation processing 154 are shown in FIG. 9. The preamble detection filters 150 illustrated in FIG. 9 perform a non-coherent correlation of the received signal samples output by the pulse detection filters 100, r$_\Sigma$(k) or r$_\Delta$(k). Non-coherent correlation is necessary when the frequency error between the ADS-B transmitter and ADS-B receiver is greater than 200 kHz. An ADS-B message preamble is detected when the received preamble pulses "align with the taps" of the preamble correlation filters 150 and all 4 sum path correlator outputs Y'$_\Sigma$(k), Y'$_\Sigma$(k−2N), Y'$_\Sigma$(k−7N) and Y'$_\Sigma$(k−9N) or difference path correlator outputs Y'$_\Delta$(k), Y'$_\Delta$(k−2N), Y'$_\Delta$(k−7N) and Y'$_\Delta$(k−9N), exceed a minimum power threshold level.

The pulse detection filter 100 outputs r$_\Sigma$(k) or r$_\Delta$(k) are also used to compute the phase difference between the last two pulses in the preamble F$_{\Sigma 1}$(k) and F$_{A1}$(k), between the last and second pulse F$_{\Sigma 2}$(k) and F$_{A2}$(k), and between the last and first pulses in the preamble, F$_{\Sigma 3}$(k) or F$_{A3}$(k). These phase differences are used to calculate the frequency error between the received preamble and the local "1090 MHz" receiver frequency at the instant of time when the preamble is detected and the pulse peak has been found.

The pulse-peak detector 152 continuously computes the difference between power received in a time interval equal to the first half of a preamble pulse and the power received in the second half of a preamble pulse, D$_\Sigma$(k) for the sum beam receive path and D$_\Delta$(k) for the difference beam receive path. The differences D$_\Sigma$(k) and D$_\Delta$(k) can be computed by summing each difference over all 4 preamble pulses as shown in FIG. 9 for D$_\Sigma$(k) or it could be done only on one (first) of the pulses. The pulse peak is detected when the 4-pulse correlator outputs exceed the minimum power threshold and its corresponding difference between the power in the first half of the pulse and the second half of the pulse, D$_\Sigma$(k) or D$_\Delta$(k), changes from positive to negative or vice versa, i.e. when it crosses the zero value.

When a preamble is detected and the pulse peak is detected in either the sum or difference receiver signal paths, diversity receiver selection logic component 160 selects the signal stream for estimation of the channel long delay multipath, multipath cancellation, and ADS-B message decoding as described below and the data samples from the other receiver are discarded. If a preamble is detected in both the sum and difference receiver signal paths, then the receiver signal path with highest signal strength is selected.

Figure 10:
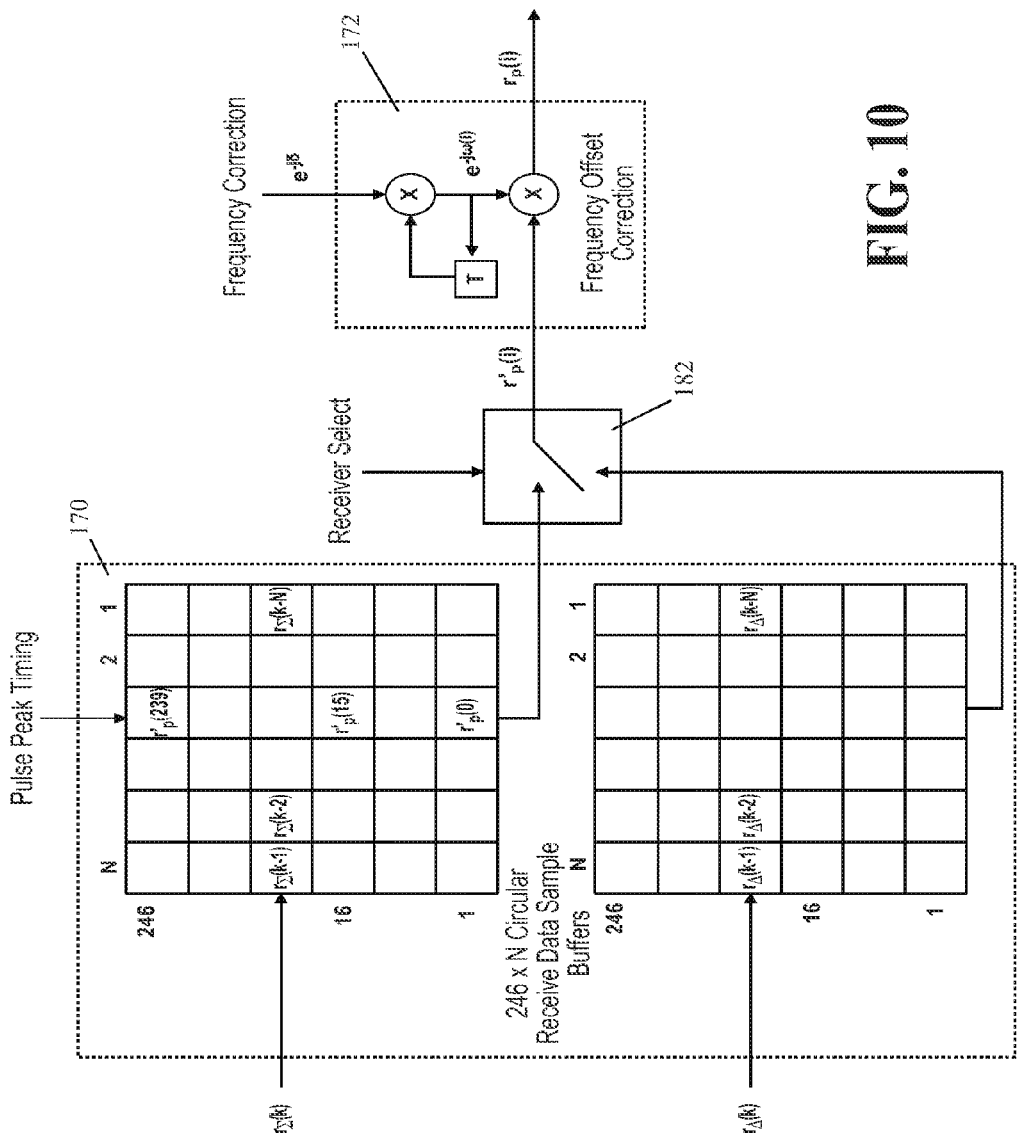

Long Delay Multipath Amplitude and Phase Estimation:

The algorithm for the estimation of the amplitude and phase of multipath with delay equal to a pulse duration or longer, as well as the multipath interference cancellation and data decoding algorithms are suitable for implementation after the received signal has been digitized. In addition it should be noted that once synchronization with the peaks of the direct path preamble pulses has been achieved, the position of the received data pulses need only be estimated at intervals equal to the pulse duration, T=0.5 μs. And therefore the delays of the multipath need only have a resolution equal to the pulse interval also. FIG. 10 shows the pre-processing of the data that is stored in the data storage buffers 170 before performing estimation of the amplitude and phase of the multipath at the delay intervals equal to the pulse duration. Each data storage buffer can be thought of as a two dimensional circular buffer where the number of columns is equal to the number of samples per pulse N and the number of rows is equal to twice the number of pulse positions between the first preamble pulse and the first message pulse, i.e. 16, plus twice the number of bits in the ADS-B message, i.e. 224, plus the maximum expected multipath delay in multiples of the pulse duration, e.g. 6. Data is stored one row at time. When a preamble is detected, the diversity receiver selection logic processing in block 160 in FIG. 9 provides a receiver select pointer to the buffer 170 corresponding to the received data to be processed. This receiver select pointer is used in block 182 to connect the buffer data output to the frequency offset correction processing block 172. Diversity receiver selection logic processing block 160 provides a second pointer to the row in the selected buffer 170 where data samples for the first preamble pulse is stored (row 1) and a pointer to the column corresponding to the pulse peak. Data to be processed is then read out of the selected buffer column corresponding to the pulse peak. The frequency offset correction processing block uses the frequency correction provided by the diversity receiver selection logic processing block 160 to remove the frequency offset between transmitter and receiver and provide this data to the multipath delay, amplitude and phase estimation block 176.

In order to be able to estimate whether a received ADS-B message is corrupted by multipath, it is necessary to have a mathematical model (see FIG. 8-2) of the relationship between the frequency corrected received samples at intervals equal to the pulse duration, $r_p(i)$. This model is to be used to estimate the direct path and multipath amplitude and phases, $h(0)$ and $h(1)$ through $h(M)$, and the amplitudes of the preamble, $p(i)$, and data, $a(i)$, pulses.

The frequency error between transmitter and receiver must be removed prior to the multipath channel complex gains estimation because the algorithm for the estimation of the pulse positions assumes that the amplitude and phase of each of the multipath components are constant throughout the message. Any frequency error will show up as a constant phase in the multipath estimates obtained from the preamble processing described in this section.

More specifically, it is assumed that the down-sampled and frequency corrected pulse matched filter outputs samples $r_p(0)$, $r_p(1)$, $r_p(2)$, ... $r_p(9)$, corresponding to the preamble pulse peaks associated with the direct line-of-sight path (LOS) are related to the preamble pulse amplitudes $p(0)$, $p(1)$, ... $p(9)$ by the mathematical representation:

$$r_p(i) = h(0)p(i) + \Sigma^M_{m=1} h(m)p(i-m) + n(i), \text{ for } i=0, 1, \ldots 9 \quad (8)$$

where the index $i=0$ represents the timing of the pulse peak associated with the reception of the first preamble pulse and the index $i=9$ represents the timing of the pulse peak associated with the last (fourth) preamble pulse received via the direct LOS path, and the precursor pulse values $p(-1)$, $p(-2)$, ... $p(-M)$ are all assumed to be 0. The $n(i)$ represent the receiver noise samples and $h(0)$ through $h(M)$ are complex gain (amplitude and phase) factors that represent the relative amplitudes of the direct path and multipath. Note that the direct path and multipath amplitude and phases $h(0)$ through $h(M)$ include the transmitter pulse response and receiver pulse matched filter response. The parameter M is the maximum multipath delay expected as a multiple of 0.5 μs. It is assumed that $M \leq 6$, i.e., longest multipath delay is less than 3 μs.

Since the preamble pulse amplitudes are known, the direct path and multipath complex gain factors are estimated by minimizing the sum of squared errors between the received samples $r_p(i)$ and estimates of the received samples, i.e., $$\min e^2 = \min\{\Sigma^9_{i=0} |r_p(i) - \Sigma^M_{m=0} h'(m)p(i-m)|^2\} \quad (9)$$

where minimization is over the unknown multipath complex gains $h'(0)$ through $h'(M)$.

It can be shown that this minimization problem reduces to solving the set of coupled linear equations $$\Sigma^9_{i=0} \Sigma^M_{m=0} p^*(i-n)p(i-m)h'(m) = \Sigma^9_{i=0} r_p(i)p^*(i-n), \text{ for } n=0, \ldots, M \quad (10)$$

which can be written in matrix form as $Ph' = z_p$ (11)

where $h'$ is an $(M+1) \times 1$ vector of the estimates of the unknown multipath complex gain factors, i.e., $$h'^t = [h'(0), h'(1), \ldots, h'(M)] \quad (12)$$

$z_p$ is a column vector with $(M+1)$ elements that represent the cross-correlation between the frequency corrected received samples and a replica of the preamble pulse sequence, i.e.

$$z_p^t = [z_p(0), z_p(1), \ldots, z_p(M)] \quad (13)$$

where $$z_p(n) = \Sigma^9_{i=0} r_p(i)p^*(i-n) = \Sigma^9_{i=0} r_p(i)p(i-n), \text{ for } n=0, \ldots, M. \quad (14)$$

P is an $(M+1) \times (M+1)$ preamble correlation matrix with elements $p_{nm}$ given by $$p_{nm} = \Sigma^9_{i=0} p^*(i-n)p(i-m) = \Sigma^9_{i=0} p(i-n)p(i-m), \text{ for } n, m=0, \ldots, M \quad (15)$$

Figure 11:
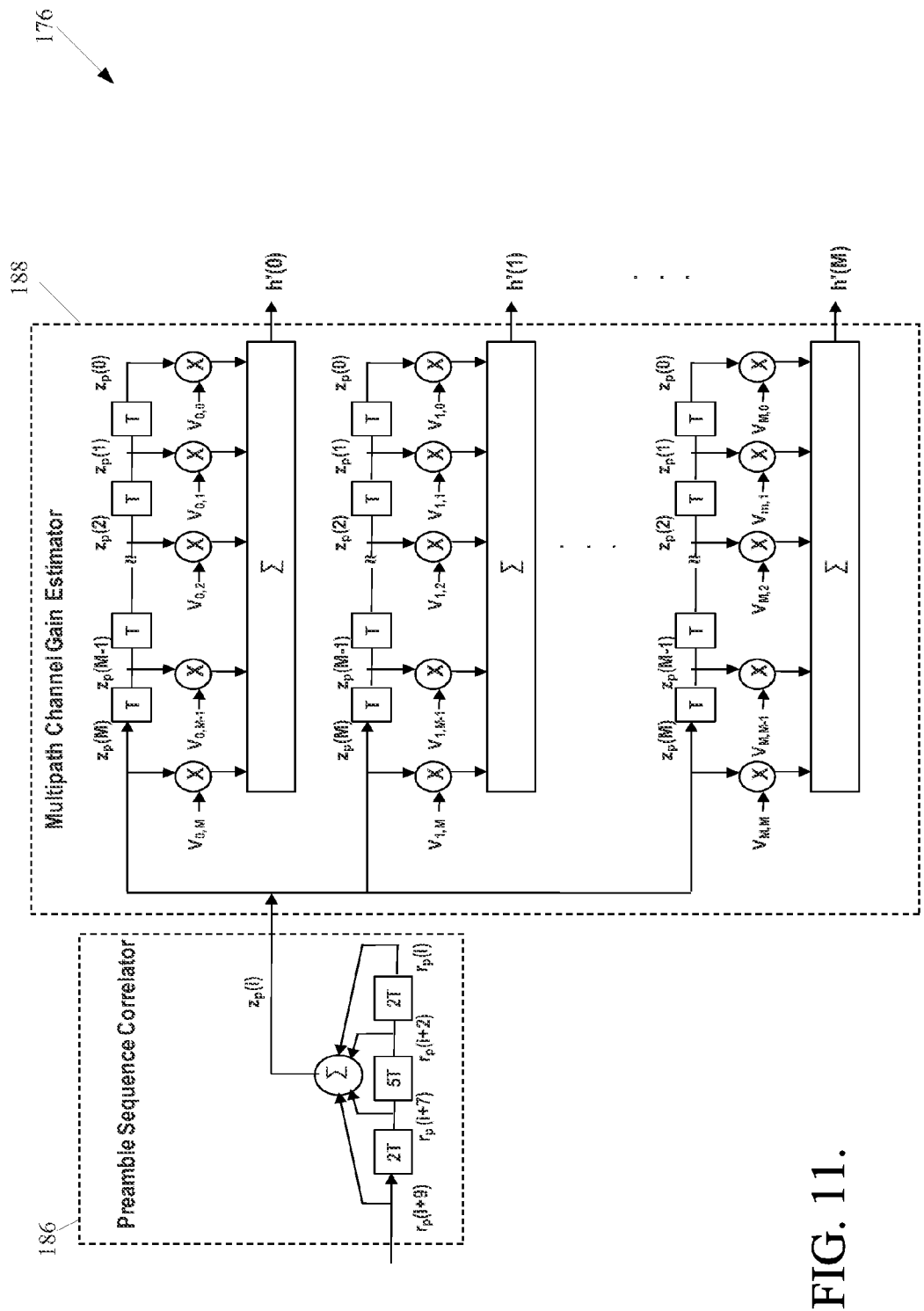
FIG. 11 illustrates an example of the Multipath, Delay, Amplitude & Phase Estimation block of FIG. 7.

From Eq. 14, it should be noted that $z_p(0)$ represents the output of the preamble matched filter 186 shown in FIG. 11 when the peaks of the preamble pulses received via the direct LOS path line up with the preamble matched filter taps, i.e., when the preamble detection is accomplished.

And the $z_p(1)$ through $z_p(M)$ are the next M frequency error compensated preamble matched filter outputs at the pulse interval.

The estimates of the multipath complex gain factors can be computed as $$h' = P^{-1} z_p = V z_p \quad (16)$$

where $V = P^{-1}$ is the inverse of the preamble correlation matrix. Also note that the inverse of the preamble correlation matrix can be pre computed and stored, making the computation of the multipath complex gains a straight forward and simple waited sum of the preamble matched filter outputs 188 shown in FIG. 11.

As an example, the preamble correlation matrix P and its inverse $P^{-1} = V$ for $M=3$ when there is no overlap between the first and second pair of pulses in the preamble is given below.

$$P = \begin{bmatrix} 4 & 0 & 2 & 0 & 0 & 1 \\ 0 & 4 & 0 & 2 & 0 & 0 \\ 2 & 0 & 4 & 0 & 2 & 0 \\ 0 & 2 & 0 & 4 & 0 & 2 \\ 0 & 0 & 2 & 0 & 4 & 0 \\ 1 & 0 & 0 & 2 & 0 & 4 \end{bmatrix}$$

$$V = P^{-1} = 1/110 \begin{bmatrix} 48 & -6 & -32 & 12 & 16 & -18 \\ -6 & 42 & 4 & -29 & -2 & 16 \\ -32 & 4 & 58 & -8 & -29 & 12 \\ 12 & -29 & -8 & 58 & 4 & -32 \\ 16 & -2 & -29 & 4 & 42 & -6 \\ -18 & 16 & 12 & -32 & -6 & 48 \end{bmatrix}$$

In this case, the estimation of the multipath complex gains is relatively simple.

If the longest multipath delay expected results in overlap between the first pair of pulses in the preamble and the second pair of pulses, the calculation of the multipath complex gains is more complex and needs to remove the interference between preamble pulses. To illustrate this case, the preamble correlation matrix P and its inverse $P^{-1}=V$ for M=5 are shown below $$P = \begin{bmatrix} 4 & 0 & 2 & 0 & 0 & 1 \\ 0 & 4 & 0 & 2 & 0 & 0 \\ 2 & 0 & 4 & 0 & 2 & 0 \\ 0 & 2 & 0 & 4 & 0 & 2 \\ 0 & 0 & 2 & 0 & 4 & 0 \\ 1 & 0 & 0 & 2 & 0 & 4 \end{bmatrix}$$

$$V = P^{-1} = 1/110 \begin{bmatrix} 48 & -6 & -32 & 12 & 16 & -18 \\ -6 & 42 & 4 & -29 & -2 & 16 \\ -32 & 4 & 58 & -8 & -29 & 12 \\ 12 & -29 & -8 & 58 & 4 & -32 \\ 16 & -2 & -29 & 4 & 42 & -6 \\ -18 & 16 & 12 & -32 & -6 & 48 \end{bmatrix}$$

ADS-B Message Decoding with Long Delay Multipath Interference Cancellation:

The multipath amplitude, phase and delay information obtained from the preamble is used to estimate the amplitudes of the pulses in the data portion of the ADS-message when multipath with delay in order of or longer than the pulse duration is interleaved or overlapped with the LOS pulses. The data pulse amplitude estimation in the presence of multipath is performed by processing the frequency error corrected pulse detection filter outputs samples that follow the detected preamble, i.e., $r_p(16), r_p(17), r_p(18), \ldots r_p(L+M-1)$ as follows.

The total number of samples used L+M is equal to twice the number of bits in the ADS-B message (L=2 times 112 bits) because each bit is received in one of two possible pulse positions plus a number samples equal to the longest multipath delay expected M. This implies that all of the pulse detection filter outputs for the ADS-B message plus M additional samples must be stored before processing can begin. The frequency error corrected pulse detection filter outputs $r_p(16), r_p(17), r_p(18), \ldots r_p(L+M-1)$ corresponding to the possible data pulse peak positions associated with the direct line-of-sight (LOS) path are related to the data pulse amplitudes $a(0), a(1), \ldots a(L-1)$ by the following set of equations $$\begin{bmatrix} r_p(16) \\ r_p(17) \\ \ldots \\ r(16+M) \\ r_p(16+M+1) \\ \ldots \\ r_p(L-1) \\ r_p(L) \\ \ldots \\ r_p(L+M-2) \\ r_p(L+M-1) \end{bmatrix} = \begin{bmatrix} h(0)a(0)+n(0) \\ h(0)a(1)+h(1)a(0)+n(1) \\ \ldots \\ h(0)a(M)+h(1)a(M-1)+\ldots+h(M)a(0)+n(M) \\ h(0)a(M+1)+h(1)a(M)+\ldots+h(M)a(1)+n(M+1) \\ \ldots \\ h(0)a(L-1)+h(1)a(L-2)+\ldots+h(M)a(L-M-1)+n(L-1) \\ h(1)a(L-1)+h(2)a(L-2)+\ldots+h(M)a(L-M)+n(L) \\ \ldots \\ h(M-1)a(L-1)+h(M)a(L-2)+n(L+M-2) \\ h(M)a(L-1)+n(L+M-1) \end{bmatrix} \quad (17)$$

Each row in Eq. 17 is represented mathematically as $$r_p(i+16)=h(0)a(i)+\Sigma^M_{m=1}h(m)a(i-m)+n(i), \text{ for } i=0,1,\ldots L-1+M \quad (18)$$

where the index i=0 represents the timing of the pulse peak associated with the possible position of the first data pulse and the index i=L−1 represents the timing of the pulse peak associated with the last possible data pulse position received via the direct LOS path. The index i=L through L+M−1 represents the timing of the pulse positions associated with multipath that arrives after the last LOS data pulse.

The parameter M is the maximum multipath delay expected as a multiple of 0.5 μs. It is assumed that M≤6, i.e., longest multipath delay is less than 3 μs.

The precursor pulse position values $a(-1), a(-2), a(-M)$ are all assumed to be 0 because no data pulses are transmitted between the last preamble pulse and the first data pulse.

The n(i) represent the receiver noise samples and h(0) through h(M) are complex gain (amplitude and phase) factors that represent the relative amplitudes of the direct path and multipath estimated from the preamble pulses. Note the magnitude of h(0) is the absolute amplitude of the pulse received via the LOS path.

The pulse amplitudes $a(0), a(1), \ldots a(L-2)a(L-1)$ can take on the value 1 or 0, depending on whether a pulse is transmitted or not in that particular position. For each pair of pulse positions, e.g., i and i+1 where i is even, one of the pulse amplitudes, $a(i)$ or $a(i+1)$, must be 1 and the other 0.

Eq. 17 represents L+M equations with L unknowns which can be solved by minimizing the sum of squared errors between the frequency corrected received samples $r_p(16+i)$ and estimates of the received samples, i.e., $$\min e^2 = \min\{\Sigma^{L-1}_{i=0}|r_p(16+i)-\Sigma^M_{m=0}h(m)a'(i-m)|^2\} \quad (19)$$

where minimization is over the unknown pulse amplitude estimates $a'(0)$ through $a'(L-1)$. The prime notation is used to indicate that a'(0) through a'(L−1) are estimates and to differentiate them from the actual transmitted pulse amplitudes a(0) through a(L−1).

Eq. 19 can be written in matrix form as $$\min e^2 = \min\{(Ha'_L - r_p)^{*t}(Ha'_L - r_p)\} \quad (20)$$

where * denotes complex conjugate and $^t$ is the vector or matrix transpose operator, H is a (L+M)×L matrix of multipath complex gains given by $$H = \begin{bmatrix}
 & 1 & 2 & 3 & \ldots & \ldots & \ldots & L-1 & L \\
h(0) & 0 & \ldots & & & & \ldots & \ldots \\
h(1) & h(0) & 0 & & & & \ldots & \ldots \\
\ldots & h(1) & h(0) & 0 & & & & \\
\ldots & \ldots & h(1) & & & & & \\
\ldots & \ldots & \ldots & & 0 & & & \\
\ldots & \ldots & \ldots & & h(0) & 0 & & \\
h(M) & h(M-1) & \ldots & \ldots \ldots & h(1) & h(0) & 0 & \\
0 & h(M) & h(M-1) & \ldots \ldots & \ldots & h(1) & h(0) & \\
\ldots & 0 & h(M) & \ldots & \ldots & \ldots & h(1) & \\
 & & 0 & \ldots & \ldots & \ldots & & \\
 & & & \ldots & \ldots & \ldots & & \\
 & & & h(M-1) & \ldots & \ldots & & \\
\ldots & \ldots & 0 & h(M) & h(M-1) & \ldots & & \\
\ldots & \ldots & \ldots & 0 & h(M) & h(M-1) & & \\
\ldots & \ldots & \ldots & \ldots & 0 & h(M) & & \\
\end{bmatrix} \begin{matrix} 1 \\ 2 \\ 3 \\ \ldots \\ \ldots \\ \ldots \\ \\ \\ \\ \\ \ldots \\ \ldots \\ \ldots \\ \\ L+M-1 \\ L+M \end{matrix} \quad (21)$$

and where $a'_L$ and $r_p$ are column vectors with L and L+M elements respectively, i.e., $$(a'_L)^t = [a'(0), a'(1), \ldots, a'(L-1)] \quad (22)$$

$$(r_p)^t = [r_p(16), r_p(17), \ldots, r_p(16+L-1), \ldots, r_p(16+L+M-1)] \quad (23)$$

Minimization with respect to the vector a' yields the matrix equation $$H^{*t}Ha'_L = H^{*t}r_p \quad (24)$$

$$R^*_L a'_L = g_L \quad (25)$$

where the matrix product $H^{*t}H = R^*_L$ is the complex conjugate of a L×L correlation matrix of the multipath complex gains given by $$R_L = \begin{bmatrix}
 & 1 & 2 & 3 & \ldots & \ldots & L-1 & L \\
\rho(0) & \rho(1) & \rho(2) & \ldots & \ldots & \rho(L-2) & \rho(L-1) \\
\rho^*(1) & \rho(1) & \rho(1) & & \ldots & & \rho(L-2) \\
\rho^*(2) & \rho^*(1) & \rho(0) & \ldots & \ldots & \ldots & \\
\ldots & \ldots & \rho^*(1) & \ldots & \ldots & \ldots & \\
\ldots & \ldots & \ldots & \rho(1) & \ldots & \ldots & \\
\ldots & \ldots & \ldots & \rho(0) & \rho(1) & \ldots & \\
\rho^*(L-2) & \ldots & \ldots & \rho^*(1) & \rho(0) & \rho(1) \\
\rho^*(L-1) & \rho^*(L-2) & \ldots & \ldots & \rho^*(1) & \rho(0) \\
\end{bmatrix} \begin{matrix} 1 \\ 2 \\ 3 \\ \ldots \\ \ldots \\ \ldots \\ L-1 \\ L \end{matrix} \quad (26)$$

and where the elements of $R_L$, are given by $$\rho(n) = \sum_{m=0}^{M-n} h(m+n) h^*(m), \text{ for } n = 0, 1, \ldots, M \quad (27)$$

$$\rho(n) = 0, \text{ for } n > M \quad (28)$$

The elements of the column vector $g_L^t = [g(0), g(1), \ldots, g(L-1)]$ are given by $$g(n) = \sum_{m=0}^{M} h^*(m) r_p(16+n+m), \text{ for } n = 0, 1, \ldots, L-1 \quad (29)$$

which represent the outputs of a filter whose inputs are the received samples at intervals equal to the pulse position intervals and whose taps (coefficients) are the complex conjugates of the multipath complex gain factors h(0) through h(M). Thus the vector $g_L$ can be thought of as the output of a RAKE multipath combiner matched filter.

Solving Eq. 24 for the unknown vector $a'_L$, it can be seen that the optimum estimates of the pulse amplitudes are given by $$a'_L = (R^*_L)^{-1} g_L \quad (30)$$

where each row of the multipath correlation matrix inverse $(R^*_L)^{-1}$ can be thought of as the weights of a linear equalizer filter which removes the multipath interference at the output of a RAKE matched filter receiver. The weights, i.e., the rows, vary as the received samples are passed through the linear equalizer because the interference depends on the previous data. Thus, the pulse position estimates are the cascade of a RAKE filter that combines the multipath coherently to maximize the signal energy and a filter that removes the interference from preceding pulses.

The matrix H and the vector $r_p$ are both known so one should in principle be able to calculate the optimum estimates of the pulse amplitudes from Eq. 30. However, inversion of $R^*_L$ is not straightforward as this matrix inverse cannot be calculated and pre-stored as was the case for the preamble correlation matrix since the multipath correlation differs for each received message. Therefore, in order to solve Eq. 24, 25 for the vector of pulse amplitudes $a'_L$ a recursive method is used for solving the set of coupled simultaneous equations of the form described in Eq. 24, 25 known as the Levinson algorithm.

Levinson Algorithm:

To apply the Levinson algorithm it is necessary to reverse the order of the simultaneous equations so that Eq. 24, 25 becomes $$R_L a^r_L = g^r_L \quad (31)$$

where $$(a^r_L)^t = [a'(L-1), a'(L-2), \ldots, a'(0)] \quad (32)$$

$$(g^r_L)^t = [g(L-1), g(L-2), \ldots, g(0)] \quad (33)$$

and where the superscript r denotes the order reverse. Eq. 31 can be solved recursively by using the following relationships $$\beta(0,0)=\rho(1)/\rho(0) \quad (34)$$

$$\beta(j,j)=[\rho(j+1)-\Sigma^j_{k=1}\rho(k)\beta(j-1,j-k)]/[\rho(0)-\Sigma^j_{k=1}\rho(k)\beta^*(j-1,k-1)], \text{ for } j=1,\ldots,L-2 \quad (35)$$

$$\beta(j,k)=\beta(j-1,k)-\beta(j,j)\beta^*(j-1,j-k-1), \text{ for } j=1,2,\ldots, L-2; k=0,1,\ldots,j-1 \quad (36)$$

$$a'(0,0)=g(0)/\rho(0) \quad (37)$$

$$a'(j,j)=[g(j)-\Sigma^j_{k=1}\rho(k)a'(j-1,j-k)]/[\rho(0)-\Sigma^j_{k=1}\rho(k)\beta^*(j-1,k-1)], \text{ for } j=1,\ldots,L-1 \quad (38)$$

$$a'(j,k)=a'(j-1,k)-a'(j,j)\beta^*(j-1,j-k-1), \text{ for } j=1,2,\ldots, L-1; k=0,1,\ldots,j-1 \quad (39)$$

Note that the first index j in Eq. 37-39 refers to the pulse position and the second index k refers to the step in the recursion. The final values in Eq. 37 and Eq. 38 are the estimates of the pulse amplitudes $a'(0)$ through $a'(L-1)$.

Pulse Amplitude Hard-Decisions and Multipath Cancellation:

Because ADS-B uses pulse position modulation to transmit a pulse in only one of two possible pulse positions, for each pair of amplitudes $a'(i)$ and $a'(i+1)$ where the index i is even, one of the pulse positions should have amplitude 1 and the other should be 0. So for each pulse position pair the amplitude of the pulse position with the larger amplitude is set to 1 and the amplitude of the pulse position with the smaller amplitude is set to 0. These are called the hard-decision pulse amplitudes $a^\dagger(i)$ and $a^\dagger(i+1)$.

The hard decision pulse amplitudes for each pulse position should not be confused with the ADS-B message bit hard-decisions which are set based on whether the pulse with amplitude 1 is in pulse position 1 or pulse position 2. Note also that the absolute value of the received pulse signal strength is given by the magnitude squared of the channel gains $h(0)$ through $h(M)$. So setting the $a^\dagger(i)$ to 1 does not discard any information regarding the variability in received signal strength.

More specifically,

For i even,

If $|a'(i)|<|a'(i+1)|$, set $a^\dagger(i)=0$ & $a^\dagger(i+1)=1$,

Otherwise, if $|a'(i)|\geq|a'(i+1)|$, set $a^\dagger(i)=1$ & $a^\dagger(i+1)=0$, The hard-decision pulse amplitudes $a^\dagger(0)$ through $a^\dagger(L-1)$ could be used as the set of pulse amplitudes from which to perform the pulse position bit demodulation. However, the quality (error) of the hard-decisions is not the same for all pulse positions across the entire message. In fact it can be seen from Eq. 17 that the first possible pulse position does not suffer from multipath interference since there are no transmissions between the last preamble pulse and the first data pulse and the maximum expected multipath delay is less than the gap between the last preamble pulse and the first data pulse. Similarly, the longest delay multipath from the last transmitted pulse in the message should be received in a pulse position which is not interfered with by multipath from previous pulse transmissions. Hence, the pulse amplitude hard-decisions corresponding to the first bit interval in the message, i.e. $a^\dagger(0)$ and $a^\dagger(1)$, and the last bit interval in the message, i.e. $a^\dagger(L-2)$ and $a^\dagger(L-1)$ are more reliable than for the other pulse positions. Hence amplitude hard-decisions for bit interval 1 and bit interval $L/2=112$ are saved and output along with a confidence measure $c(1)$ for bit interval 1 and $c(112)$ bit interval 112 which are equal to the ratio of the larger estimated amplitude to the smaller estimated amplitude in bit interval 1 and in bit interval 112, respectively.

Improved estimates for the pulse amplitudes $a'(2)$ through $a'(L-3)$ can be obtained by subtracting the hard-decisions $a^\dagger(0)$, $a^\dagger(1)$, $a^\dagger(L-2)$ and $a^\dagger(L-1)$ from the frequency corrected received data samples $r_p(16+i)$ and re-estimating the pulse amplitudes $a'(2)$ through $a'(L-3)$ by applying the Levinson algorithm again. This would be analogous to decision feedback equalization where weighted hard-decisions are fed back to remove the multipath interference prior to making a decision on the following data.

The new set of equations that must be solved are expressed in matrix form as $$R^*_{L-4}a'_{L-4}=g_{L-4} \quad (40)$$

where $$(a'_{L-4})^t=[a'(2),a'(3),\ldots,a'(L-3)] \quad (41)$$

$$R_{L-4}=\begin{bmatrix} \rho(0) & \rho(1) & \rho(2) & \ldots & \ldots & \rho(L-5) & \rho(L-4) \\ \rho^*(1) & \rho(1) & \rho(1) & \ldots & \ldots & & \rho(L-5) \\ \rho^*(2) & \rho^*(1) & \rho(0) & \ldots & \ldots & & \ldots \\ \ldots & \ldots & \rho^*(1) & \ldots & \ldots & & \ldots \\ \ldots & \ldots & \ldots & \rho(1) & \ldots & & \ldots \\ \ldots & \ldots & \ldots & \rho(0) & \rho(1) & & \ldots \\ \rho^*(L-5) & \ldots & \ldots & \ldots & \rho^*(1) & \rho(0) & \rho(1) \\ \rho^*(L-4) & \rho^*(L-5) & \ldots & \ldots & \ldots & \rho^*(1) & \rho(0) \end{bmatrix} \begin{matrix} 1 \\ 2 \\ 3 \\ \ldots \\ \ldots \\ \ldots \\ L-3 \\ L-4 \end{matrix} \quad (42)$$

with the $\rho(n)$ given by Eq. 27, 28.

The elements of the column vector $(g_{L-4})^t=[g(2), g(3),\ldots,g(L-3)]$ are given by $$g(n)=\Sigma^M_{m=0}h^*(m)c_{L-4}(n+m), \text{ for } n=2,3,\ldots,L-3 \quad (43)$$

where the $c_{L-4}(n)$ are the received samples minus the hard decisions for the first two and last two pulse amplitudes weighted by the multipath complex gain factors, i.e., $$c_{L-4} = \begin{bmatrix} c_{L-4}(2) \\ c_{L-4}(3) \\ \ldots \\ c_{L-4}(M) \\ c_{L-4}(M+1) \\ \ldots \\ c_{L-4}(L-2) \\ c_{L-4}(L-1) \\ c_{L-4}(L) \\ \ldots \\ c_{L-4}(L+M-4) \\ c_{L-4}(L+M-3) \end{bmatrix} = \begin{bmatrix} r_p(16+2) - h(1)a+(1) - h(2)a+(0) \\ r_p(16+3) - h(2)a+(1) - h(3)a+(0) \\ \ldots \qquad \ldots \\ r_p(16+M) - h(M-1)a+(1) - h(M)a+(0) \\ r_p(16+M+1) - h(M)a+(1) \\ \ldots \\ r_p(16+L-2) - h(0)a+(L-2) \\ r_p(16+L-1) - h(0)a+(L-1) - h(1)a+(L-2) \\ r_p(16+L) - h(1)a+(L-1) - h(2)a+(L-2) \\ \ldots \\ r_p(16+L+M-4) - h(M-3)a+(L-1) - h(M-2)a+(L-2) \\ r_p(16+L+M-3) - h(M-1)a+(L-2) \end{bmatrix} \quad (44)$$

Eq. 40 is also solved using the Levinson algorithm given in Equations 34 through 39. However, this time only the elements of the column vectors $g_{L-4}$ and $a'_{L-4}$ given in Eq. 43, Eq. 44, and Equations 37 through 39 should be recomputed. The elements of the correlation matrix $R_{L-4}$ defined in Eq. 27, 28 and the recursion factors $\beta(j, k)$ in Eq. 34, 35 do not change and should be stored after the first pass through the Levinson algorithm. The hard-decisions for $a^\dagger(2)$, $a^\dagger(3)$, $a^\dagger(L-4)$ and $a^\dagger(L-3)$ are then saved and output after the second pass along with the confidence measure $c(2)$ for bit interval 2 and $c(111)$ for bit interval $(L-2)/2=111$ and the procedure is repeated until pulse position hard decision amplitudes and confidence measures for all the bit intervals are obtained four at a time.

Pulse Position Bit Demodulation:

The pulse amplitude hard-decisions $a^\dagger(0)$, $a^\dagger(1)$, ..., $a^\dagger(L-2)$ and $a^\dagger(L-1)$ that correspond to a pulse position where it has been decided that no pulse has been "received" after multipath cancellation are set to "0" while the pulse amplitude hard decisions that correspond to a pulse position where a pulse has been received are set to "1". The pulse amplitudes are then used to make a decision as to whether a "0" bit or "1" bit has been transmitted by taking the pulse amplitude hard decisions in pairs and making a bit decision based on whether the "1" pulse amplitude occupies the even, or the odd pulse position. The bits decisions $d(1), d(2), \ldots, d(L/2)$ and the confidence measures $c(1), c(2), \ldots, c(L/2)$ are the output of the pulse position demodulator and serve as the input to the ADS-B message decoder.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a plurality of receivers,
      receiving a plurality of signals from a plurality of diversity antennas;
   at a device in communication with the plurality of receivers,
      simultaneously processing the plurality of signals to detect the reception of an ADS-B message in the presence of short delay and long delay multipath signals to produce a signal that is free of interference from the short delay multipath signals;
      removing interference from the long delay multipath signals from the produced signal; and
      outputting an ADS-B message based on the produced signal that is free of short delay interference signals with the removed interference from long delay multipath signals.

2. The method of claim 1, wherein the plurality of diversity antennas comprise antennas configure to receive signals at 1090 MHz.

3. The method of claim 2, wherein the diversity antennas comprise a first pair of horizontally spaced antennas and simultaneous processing of the signals received by these two antennas comprises:
   summing the signals received from first and second horizontally separated antennas to create a first sum signal;
   subtracting the signals received from the first and second antennas to create a first difference signal; and
   simultaneously processing the first sum signal and the first difference signal to detect the reception of an ADS-B message in the presence of short delay and long delay multipath signals.

4. The method of claim 3, wherein the diversity antennas comprise a second pair of antennas spaced horizontally in a plane perpendicular to the plane of the first pair of antennas and simultaneous processing of the signals received by this second pair of antennas comprises:
   summing the signals received from third and fourth horizontally separated antennas to create a second sum signal;
   subtracting the signals received from the third and fourth antennas to create a second difference signal; and
   simultaneously processing the second sum signal and the second difference signal to detect the reception of an ADS-B message in the presence of short delay and long delay multipath signals.

5. The method of claim 4, wherein the plurality of signals comprise automatic dependent surveillance-broadcast (ADS-B) signals.

6. The method of claim 5, wherein the first and second antennas are vertically separated from the third and fourth antennas.

7. The method of claim 5, wherein the horizontal separation is approximately at least half of the wavelength of the ADS-B signals.

8. The method of claim 5, wherein the first and second antennas are horizontally and vertically separated and the second and fourth antennas are horizontally and vertically separated.

9. The method of claim 4, wherein outputting the ADS-B message in the presence of short delay and long delay multipath signals comprises:
   performing preamble correlation for each of the first and second sum signals and first and second difference signals based on a previously known ADS-B message preamble configuration;
   selecting one of the first and second sum and difference signals with associated start-of-message value, pulse-peak timing value and frequency offset value based on the performed preamble correlation and a predefined power threshold; and
   storing each of the first and second sum and difference signals in a buffer, and
   wherein removing the interference from long delay multipath signals comprises:
      retrieving one of the stored sum and difference signals based on the selected signal;
      correcting a frequency error of the retrieved signal based on a frequency offset value associated with the selected signal;
      correlating the frequency error corrected signal with the previously known ADS-B message preamble configuration;
      estimating the amplitude and phase of the multipath signals at delay intervals of 500 ns based on the output of the correlation between the frequency error corrected selected signal with the known ADS-B preamble configuration that precedes the ADS-B message bits; and
      cancelling any corruption of the ADS-B message bits that follow the preamble by long delay multipath signal interference based on the estimated amplitude and phase of multipath signals at delay intervals of 500 ns.

10. A system comprising:
   a plurality of diversity antennas configured to receive a plurality of signals;
   a plurality of receivers configured to receive the plurality of signals from the plurality of diversity antennas;
   a device in communication with the plurality of receivers, the device configured to:
      simultaneously process the plurality of signals to detect the reception of an ADS-B message in the presence of short delay and long delay multipath signals to produce a signal that is free of interference from the short delay multipath signals;
      remove interference from the long delay multipath signals from the produced signal; and
      output an ADS-B message based on the produced signal that is free of short delay interference signals with the removed interference from long delay multipath signals.

11. The system of claim 10, wherein the plurality of diversity antennas comprise antennas configure to receive signals at 1090 MHz.

12. The system of claim 11, wherein the diversity antennas comprise a first pair of horizontally spaced antennas and the device simultaneous processes by:
   summing the signals received from first and second horizontally separated antennas to create a first sum signal;
   subtracting the signals received from the first and second antennas to create a first difference signal; and
   simultaneously processing the first sum signal and the first difference signal to detect the reception of an ADS-B message in the presence of short delay and long delay multipath signals.

13. The system of claim 12, wherein the diversity antennas comprise a second pair of antennas spaced horizontally in a plane perpendicular to the plane of the first pair of antennas and the device simultaneous processes by:
   summing the signals received from third and fourth horizontally separated antennas to create a second sum signal;
   subtracting the signals received from the third and fourth antennas to create a second difference signal; and
   simultaneously processing the second sum signal and the second difference signal to detect the reception of an ADS-B message in the presence of short delay and long delay multipath signals.

14. The system of claim 13, wherein the plurality of signals comprise automatic dependent surveillance-broadcast (ADS-B) signals.

15. The system of claim 14, wherein the first and second antennas are vertically separated from the third and fourth antennas.

16. The system of claim 14, wherein the horizontal separation is approximately at least half of the wavelength of the ADS-B signals.

17. The system of claim 14, wherein the first and second antennas are horizontally and vertically separated and the second and fourth antennas are horizontally and vertically separated.

18. The system of claim 13, wherein the device outputs the ADS-B message in the presence of short delay and long delay multipath signals by:
   performing preamble correlation for each of the first and second sum signals and first and second difference signals based on a previously known ADS-B message preamble configuration;
   selecting one of the first and second sum and difference signals with associated start-of-message value, pulse-peak timing value and frequency offset value based on the performed preamble correlation and a predefined power threshold; and
   storing each of the first and second sum and difference signals in a buffer, and
   wherein the device removes the interference from long delay multipath signals by:
      retrieving one of the stored sum and difference signals based on the selected signal;
      correcting a frequency error of the retrieved signal based on a frequency offset value associated with the selected signal;
      correlating the frequency error corrected signal with the previously known ADS-B message preamble configuration;
      estimating the amplitude and phase of the multipath signals at delay intervals of 500 ns based on the output of the correlation between the frequency error corrected selected signal with the known ADS-B preamble configuration that precedes the ADS-B message bits; and
      cancelling any corruption of the ADS-B message bits that follow the preamble by long delay multipath signal interference based on the estimated amplitude and phase of multipath signals at delay intervals of 500 ns.

19. A system comprising:
   a means for receiving a plurality of signals from a plurality of diversity antennas, wherein the diversity antennas are at least one of spaced horizontally on a vehicle by a plurality of ADS-B signal wavelengths or each of the diversity antennas produces a different azimuth antenna pattern; and a means for
simultaneously processing the plurality of signals to detect the reception of an ADS-B message in the presence of short delay and long delay multipath signals to produce a signal that is free of interference from the short delay multipath signals;
removing interference from the long delay multipath signals from the produced signal; and
outputting an ADS-B message based on the produced signal that is free of short delay interference signals with the removed interference from long delay multipath signals.

* * * * *